United States Patent
Chang et al.

(10) Patent No.: US 9,900,664 B2
(45) Date of Patent: Feb. 20, 2018

(54) METHOD AND SYSTEM FOR DISPLAY CONTROL, BREAKAWAY JUDGING APPARATUS AND VIDEO/AUDIO PROCESSING APPARATUS

(71) Applicant: Industrial Technology Research Institute, Hsinchu (TW)

(72) Inventors: Chen-Guei Chang, Taoyuan (TW); Ming-Yen Chen, Pingtung County (TW); Ming-Shyan Wei, Hsinchu (TW); Yuan-Chu Tai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/979,520

(22) Filed: Dec. 28, 2015

(65) Prior Publication Data

US 2016/0212495 A1 Jul. 21, 2016

Related U.S. Application Data

(60) Provisional application No. 62/103,577, filed on Jan. 15, 2015.

(30) Foreign Application Priority Data

Jun. 30, 2015 (TW) .............................. 104121133 A

(51) Int. Cl.
*H04H 20/14* (2008.01)
*H04N 21/488* (2011.01)
(Continued)

(52) U.S. Cl.
CPC ..... *H04N 21/4882* (2013.01); *H04N 21/4122* (2013.01); *H04N 21/4126* (2013.01);
(Continued)

(58) Field of Classification Search
CPC ................................................... H04N 21/812
(Continued)

(56) References Cited

U.S. PATENT DOCUMENTS 6,016,144 A 1/2000 Blonstein et al.
6,181,333 B1 1/2001 Chaney et al.
(Continued)

FOREIGN PATENT DOCUMENTS

CN 201207705 3/2009
CN 102388378 3/2012
(Continued)

OTHER PUBLICATIONS

"Office Action of Europe Counterpart Application", dated May 27, 2016, p. 1-p. 10.
(Continued)

*Primary Examiner* — Michael Hong
(74) *Attorney, Agent, or Firm* — JCIPRNET

(57) ABSTRACT

A method and system for display control, a breakaway judging apparatus and a video/audio processing apparatus are provided. The method includes following steps. A display signal source is received and a play content is obtained according to the display signal source. It is judged whether a play time corresponding to the play content is in a breakaway time according to at least one advertising fingerprint, wherein the at least one advertising fingerprint is a characteristic message corresponding to the play content, and the breakaway time is at least one time interval for playing at least one advertisement in the play content. If the play time corresponding to the play content is in the breakaway time, a prompt message is superimposed to the play content.

33 Claims, 13 Drawing Sheets

(51) Int. Cl.
*H04N 21/44* (2011.01)
*H04N 21/81* (2011.01)
*H04N 21/41* (2011.01)
*H04N 21/431* (2011.01)
*H04N 21/438* (2011.01)

(52) U.S. Cl.
CPC ..... *H04N 21/4316* (2013.01); *H04N 21/4383* (2013.01); *H04N 21/44008* (2013.01); *H04N 21/812* (2013.01)

(58) Field of Classification Search
USPC .......................................................... 725/22
See application file for complete search history.

(56) References Cited

U.S. PATENT DOCUMENTS

| | | |
|---|---|---|
| 6,191,781 B1 | 2/2001 | Chaney et al. |
| 6,195,089 B1 | 2/2001 | Chaney et al. |
| 6,243,142 B1 | 6/2001 | Mugura et al. |
| 6,292,226 B1 | 9/2001 | Yamanaka et al. |
| 6,400,379 B1 | 6/2002 | Johnson et al. |
| 6,411,308 B1 | 6/2002 | Blonstein et al. |
| 6,424,791 B1 | 7/2002 | Saib |
| 6,518,986 B1 | 2/2003 | Mugura |
| 6,570,595 B2 | 5/2003 | Porter |
| 6,577,350 B1 | 6/2003 | Proehl et al. |
| 6,910,191 B2 | 6/2005 | Segerberg et al. |
| 6,954,897 B1 | 10/2005 | Noguchi et al. |
| 6,965,951 B2 | 11/2005 | Kim |
| 6,978,472 B1 | 12/2005 | Nashida et al. |
| 7,032,176 B2 | 4/2006 | Gordon et al. |
| 7,100,184 B1 | 8/2006 | Kahn |
| 7,102,613 B1 | 9/2006 | Morrish |
| 7,102,651 B1 | 9/2006 | Louveaux et al. |
| 7,117,440 B2 | 10/2006 | Gordon et al. |
| 7,137,068 B1 | 11/2006 | Robin |
| 7,139,983 B2 | 11/2006 | Kelts |
| 7,151,546 B1 | 12/2006 | Louveaux |
| 7,158,118 B2 | 1/2007 | Liberty |
| 7,171,474 B2 | 1/2007 | Shanthaveeraiah et al. |
| 7,200,646 B2 | 4/2007 | Shanthaveeraiah et al. |
| 7,236,156 B2 | 6/2007 | Liberty et al. |
| 7,239,301 B2 | 7/2007 | Liberty et al. |
| 7,260,789 B2 | 8/2007 | Hunleth et al. |
| 7,262,760 B2 | 8/2007 | Liberty |
| 7,386,806 B2 | 6/2008 | Wroblewski |
| 7,414,611 B2 | 8/2008 | Liberty |
| 7,415,189 B2 | 8/2008 | Nishikawa et al. |
| 7,423,549 B2 | 9/2008 | Perdue |
| 7,489,298 B2 | 2/2009 | Liberty et al. |
| 7,489,299 B2 | 2/2009 | Liberty et al. |
| 7,505,046 B1 | 3/2009 | Louveaux |
| 7,523,415 B1 | 4/2009 | Porter |
| 7,535,456 B2 | 5/2009 | Liberty et al. |
| 7,565,427 B2 | 7/2009 | Brelin |
| 7,703,043 B2 | 4/2010 | Utsuki et al. |
| 7,786,976 B2 | 8/2010 | Ohta |
| 7,834,849 B2 | 11/2010 | Hunleth et al. |
| 7,836,467 B2 | 11/2010 | Gordon et al. |
| 7,839,385 B2 | 11/2010 | Hunleth et al. |
| 7,844,987 B2 | 11/2010 | Kelts |
| 7,860,676 B2 | 12/2010 | Sheng et al. |
| 7,877,224 B2 | 1/2011 | Ohta |
| 7,890,884 B2 | 2/2011 | Porter |
| 7,893,950 B2 | 2/2011 | Louveaux |
| 7,987,484 B2 | 7/2011 | Sloo |
| 8,010,665 B2 | 8/2011 | Brelin, I |
| 8,041,536 B2 | 10/2011 | Ohta |
| 8,046,705 B2 | 10/2011 | Hunleth et al. |
| 8,046,804 B2 | 10/2011 | Kelts |
| 8,072,424 B2 | 12/2011 | Liberty |
| 8,137,195 B2 | 3/2012 | Penzias |
| 8,169,405 B2 | 5/2012 | Hunleth et al. |
| 8,237,657 B2 | 8/2012 | Liberty et al. |
| 8,243,199 B2 | 8/2012 | Sumiyoshi et al. |
| 8,359,545 B2 | 1/2013 | Pixley et al. |
| 8,407,022 B2 | 3/2013 | Sheng et al. |
| 8,413,205 B2 | 4/2013 | Carney et al. |
| 8,416,952 B1 | 4/2013 | Moreau et al. |
| 8,432,358 B2 | 4/2013 | Hunleth et al. |
| 8,448,208 B2 | 5/2013 | Moreau et al. |
| 8,473,245 B2 | 6/2013 | Ohta |
| 8,508,472 B1 | 8/2013 | Wieder |
| 8,528,036 B2 | 9/2013 | Davis et al. |
| 8,555,165 B2 | 10/2013 | Hunleth et al. |
| 8,578,411 B1 | 11/2013 | Carney et al. |
| 8,601,396 B2 | 12/2013 | Hunleth et al. |
| 8,601,510 B2 | 12/2013 | Araki et al. |
| 8,629,836 B2 | 1/2014 | Liberty |
| 8,683,850 B2 | 4/2014 | Sheng et al. |
| 8,707,354 B1 | 4/2014 | Moreau et al. |
| 8,745,658 B2 | 6/2014 | Carney et al. |
| 8,756,634 B2 | 6/2014 | Chane et al. |
| 8,766,917 B2 | 7/2014 | Liberty et al. |
| 8,795,079 B2 | 8/2014 | Penzias, III |
| 8,799,944 B2 | 8/2014 | Angiolillo et al. |
| 8,819,734 B2 | 8/2014 | Moreau et al. |
| 2002/0075402 A1* | 6/2002 | Robson ............. H04N 5/44513 348/460 |
| 2004/0226035 A1 | 11/2004 | Hauser, Jr. |
| 2004/0260682 A1* | 12/2004 | Herley ............... G06K 9/00496 |
| 2007/0250771 A1 | 10/2007 | Lee et al. |
| 2008/0022300 A1 | 1/2008 | Angiolillo et al. |
| 2009/0251611 A1 | 10/2009 | Sumiyoshi et al. |
| 2011/0141218 A1 | 6/2011 | Stancato |
| 2013/0071090 A1 | 3/2013 | Berkowitz et al. |
| 2013/0205323 A1 | 8/2013 | Sinha et al. |
| 2013/0205330 A1 | 8/2013 | Sinha et al. |
| 2013/0308818 A1* | 11/2013 | MacIntosh ............ G06T 1/0021 382/100 |
| 2014/0115618 A1 | 4/2014 | Harada et al. |
| 2014/0208342 A1 | 7/2014 | Chou et al. |
| 2014/0267931 A1 | 9/2014 | Gilson et al. |
| 2014/0282745 A1 | 9/2014 | Chipman et al. |
| 2015/0326814 A1* | 11/2015 | Stephens ................ H04N 5/445 725/32 |
| 2016/0119684 A1* | 4/2016 | Flores .................. H04N 21/252 725/45 |

FOREIGN PATENT DOCUMENTS

| | | |
|---|---|---|
| CN | 101790054 | 5/2013 |
| CN | 103475943 | 12/2013 |
| EP | 1619888 | 1/2006 |
| EP | 2472900 | 7/2012 |
| GB | 2425909 | 11/2006 |
| TW | 201141211 | 11/2011 |
| TW | 201207751 | 2/2012 |
| TW | 201222271 | 6/2012 |
| TW | M470462 | 1/2014 |
| TW | 201431367 | 8/2014 |
| TW | M485460 | 9/2014 |
| WO | 03043318 | 5/2003 |
| WO | 2007039787 | 4/2007 |

OTHER PUBLICATIONS

Kim et al., "Home appliances controlling through Smart TV set-top box with screen-mirroring remote controller", 2013 International Conference on ICT Convergence (ICTC), Jan. 2013, pp. 1009-1012.
Kim et al., "Smart TV usage extension method using screen division and virtual network computing", 2013 7th International Conference on Application of Information and Communication Technologies (AICT), Oct. 2013, pp. 1-5.
Kim et al., "GUI screen-sharing smart remote control for smart TV user interface", 2013 International Conference on ICT Convergence (ICTC), Oct. 2013, pp. 711-713.
Hu et al., "Toward Scalable Systems for Big Data Analytics: A Technology Tutorial", IEEE Access, Jun. 24, 2014, pp. 652-687.
Hu et al., "Towards Multi-Screen Social TV with Geo-Aware Social Sense", IEEE Multimedia, Feb. 2014, pp. 1-6.

(56) References Cited

OTHER PUBLICATIONS

Nixon et al., "Seamlessly interlinking TV and Web content to enable Linked Television", ACM Int. Conf. on Interactive Experiences for Television and Online Video, Jun. 2014, pp. 1-4.
"Office Action of Taiwan Counterpart Application", dated Jul. 22, 2016, p. 1-p. 11.

* cited by examiner

METHOD AND SYSTEM FOR DISPLAY CONTROL, BREAKAWAY JUDGING APPARATUS AND VIDEO/AUDIO PROCESSING APPARATUS

CROSS-REFERENCE TO RELATED APPLICATION

This application claims the priority benefits of U.S. provisional application Ser. No. 62/103,577, filed on Jan. 15, 2015 and Taiwan application serial no. 104121133, filed on Jun. 30, 2015. The entirety of each of the above-mentioned patent applications is hereby incorporated by reference herein and made a part of this specification.

TECHNICAL FIELD

The disclosure relates to a display control method, display control system, breakaway judging apparatus and video/audio processing apparatus.

BACKGROUND

Along with popularity of mobile devices and increase of Internet multimedia content, people have more diversified and personalized channels to conduct media viewing and hearing activities, which causes a great challenge to TV industry. It seems that a TV set played a role of information and entertainment center in the past gradually loses a position of media center and entertainment platform, but it actually does not. According to investigation of a research institute TNS (Taylor Nelson Sofres), people all over the world still have the habit to watch TV. However, due to development of network media and handheld electronic devices, users also use mobile phones or tablets to search or receive information while watching TV, such that a "screen-stacking" phenomenon is occurred.

The TNS performs a survey on more than 55,000 global respondents, and a result shows that each modern people averagely owns four digital devices, and the respondents in Hong Kong, Australia and the UK even own five digital devices averagely. Moreover, due to the demand of the audience on TV and a demand of viewing video content at anytime anywhere, it promotes arising of a viewing pattern of "multi-screen viewing" or "screen-stacking" (i.e. the user simultaneously uses a plurality of digital devices). The survey of the TNS also found that nearly a half of the respondents (48%) also use other electronic devices while watching TV during the night, for example, to use social media, check E-mails or conduct Internet shopping, etc. 72% of the respondents may use "multi-screen" while watching TV, and many of them comment on the program, the game, the performance on the social media at the same time, and such phenomenon have become a norm worldwide.

Therefore, manufacturers develop Internet TVs or smart TVs to satisfy such demand. However, the practitioners also discover that more than 40% of the users only browse TV programs through the smart TVs, and do not use other functions (such as to use social software, browse WebPages or use communication software, etc.) except for watching TV on the smart TV. A national purchase diary (NPD) conducts a related survey and provides a report, which shows that no more than 15% of the users owning the smart TVs in home may use the smart TVs to implement other functions besides watching TV programs, such as to listen to music, browse websites, or conduct Internet shopping, etc., and a main reason thereof is that an interface of the smart TV is too complicated, and related applications are not specially designed for the TV platform. Moreover, the other devices of the user (for example, a tablet PC, a smart phone, a laptop computer, etc.) already have the same functions, and operation interfaces and operation experiences of the above devices are superior than that of the smart TV. In addition, lack of high quality content and poor operation experience are also the reasons why the users do not use over the top (OTT) services. The OTT services are services provided by related practitioners through a network, for example, services such as audio and video media, E-mail communication, message transmission, etc. Therefore, in a situation that the operation experiences of the products sold in the market are generally poor, the users are hard to obey an originally designed service flow to conduct operations, such that expected purposes and effects of the smart TVs are hard to be achieved.

According to the above analysis, the existing TV usage pattern is still based on a single content source and a single layer display. When a user wants to get information other than the TV channel content or get information services provided by an OTT practitioner, it is hard to get the information through a same frame at the same time, and the user has to use extra devices (for example, a PC, a handheld device, etc.) to get the above information by himself. Moreover, if the TV itself provides the Internet accessing function or an external smart TV stick is equipped, the user has to use two or more remote controllers to manually switch a TV source in order to receive the external information. In addition, the above situation depends on operations conducted by the user when the user needs external information, and most of the TV sets do not have a mechanism for automatically providing notifications and delivering messages.

SUMMARY OF THE DISCLOSURE

The disclosure is directed to a display control method, a display control system, a breakaway judging apparatus and a video/audio processing apparatus, which improve a viewing convenience of a user using a display apparatus.

The disclosure provides a display control method, which is adapted to a display apparatus. The method includes following steps. A display signal source is received and a play content is obtained according to the display signal source. It is judged whether a play time corresponding to the play content is in a breakaway time according to at least one advertising fingerprint, wherein the at least one advertising fingerprint is a characteristic message corresponding to the play content, and the breakaway time is at least one time interval for playing at least one advertisement in the play content. If the play time corresponding to the play content is in the breakaway time, a prompt message is superimposed to the play content. If the play time corresponding to the play content is after an end of the breakaway time, another prompt message is displayed on the display apparatus, wherein the another prompt message is used for prompting that the breakaway time of the play content is ended.

The disclosure provides a display control system including a display apparatus, a video/audio processing apparatus and a breakaway judging apparatus. The video/audio processing apparatus is coupled to the display apparatus. The breakaway judging apparatus is coupled to the video/audio processing apparatus, and is configured to receive a play content message from the video/audio processing apparatus. Moreover, the breakaway judging apparatus judges whether a play time of a play content corresponding to the play content message is in a breakaway time according to at least one advertising fingerprint, wherein the at least one advertising fingerprint is a characteristic message corresponding to the play content, and the breakaway time is at least one time interval for playing at least one advertisement in the play content. If the play time corresponding to the play content is in the breakaway time, the breakaway judging apparatus transmits a notification message to the video/audio processing apparatus, and the video/audio processing apparatus superimposes a prompt message to the play content. If the play time corresponding to the play content is after an end of the breakaway time, the video/audio processing apparatus displays the another prompt message on the display apparatus, wherein the another prompt message is used for prompting that the breakaway time of the play content is ended.

The disclosure provides a breakaway judging apparatus including an input/output interface and a processing unit. The input/output interface is configured to receive a display signal source. The processing unit is coupled to the input/output interface, and is configured to obtain a play content according to the display signal source. The processing unit judges whether a play time corresponding to the play content is in a breakaway time according to at least one advertising fingerprint, wherein the at least one advertising fingerprint is a characteristic message corresponding to the play content, and the breakaway time is at least one time interval for playing at least one advertisement in the play content. If the play time corresponding to the play content is in the breakaway time, a breakaway judging notification is sent through the input/output interface.

The disclosure provides a video/audio processing apparatus including an input/output interface and a processing unit. The processing unit is coupled to the input/output interface, wherein the processing unit is configured to output a play content message through the input/output interface, and receive a notification message through the input/output interface, wherein the notification message is configured to indicate whether a play time of a play content corresponding to the play content message is in a breakaway time, wherein the breakaway time is at least one time interval for playing at least one advertisement in the play content. If the play time corresponding to the play content is in the breakaway time, the processing unit superimposes a notification message to the play content. If the play time corresponding to the play content is after an end of the breakaway time, the processing unit sends another prompt message and displays the another prompt message on the display apparatus, wherein the another prompt message is used for prompting that the breakaway time of the play content is ended.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The disclosure provides a display and control method, and the method is used for judging whether a play time of a play content currently viewed by a user is a breakaway time. The breakaway represents an advertisement inserted in a play content, and the breakaway time represents at least one time interval scheduled to play at least one advertisement in the play content, i.e. an advertising time. If the play time of the play content currently viewed by the user is the breakaway time, a prompt message can be superimposed to a displayed image, and the user can interact with the prompt message. According to such method, in case that user's viewing is not influenced or interrupted, superimposed information besides the play content (for example, a TV program) is provided in a same frame. According to such technique, a multi-screen information single-screen fusion effect and a two-way interactive optimisation effect are achieved on the display apparatus (for example, a TV).

Figure 1:
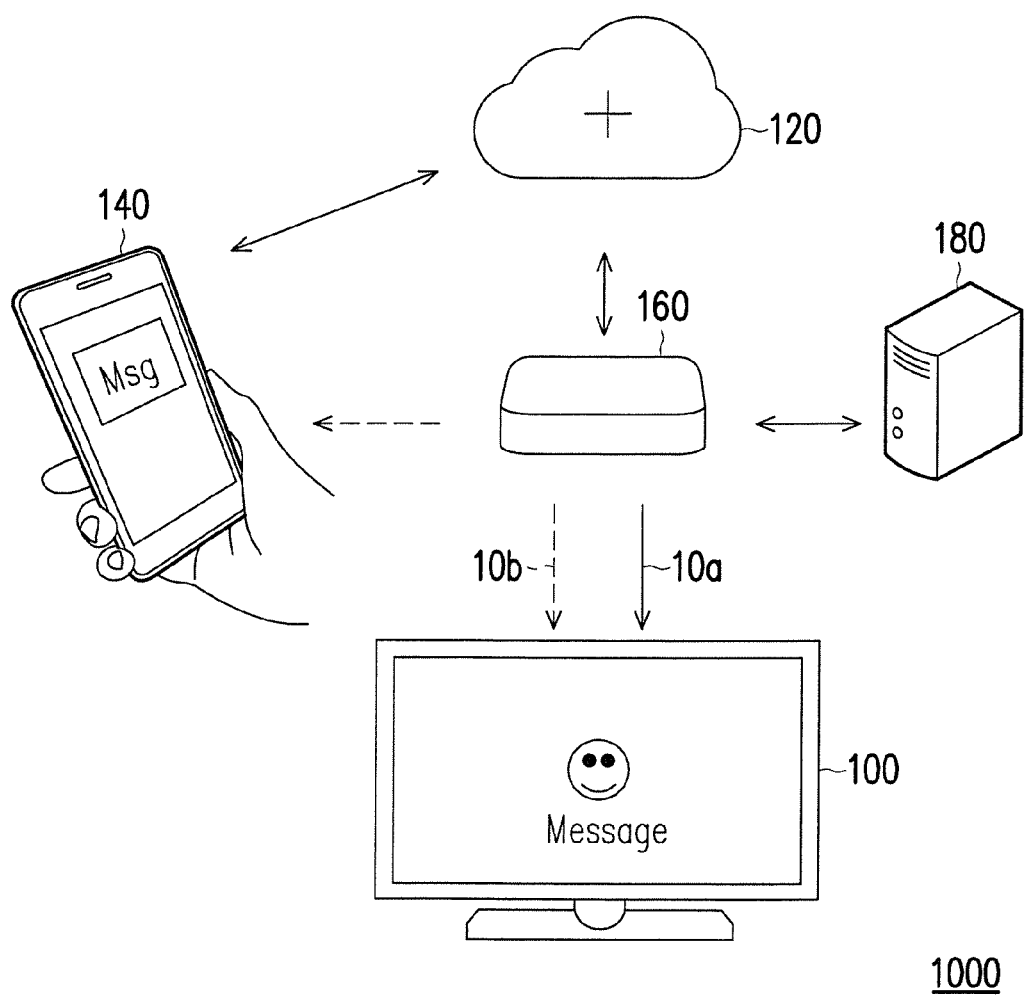
FIG. 1 is a schematic diagram of a display control system according to an exemplary embodiment of the disclosure.

FIG. 1 is a schematic diagram of a display control system according to an exemplary embodiment of the disclosure.

Referring to FIG. 1, the display control system 1000 includes a display apparatus 100, an over the top (OTT)

service provider 120, a handheld device 140, a video/audio processing apparatus 160 and a breakaway judging apparatus 180. In the exemplary embodiment, the display apparatus 100 is a digital TV, though in other embodiments, the display apparatus 100 can be an analog TV, a digital photo frame display device, a desktop computer, a laptop computer, a tablet personal computer (PC), a mobile phone, a smart phone, an E-book or a multimedia display device, etc. The OTT service provider 120 can be a network service provider having one or a plurality of desktop computers, laptop computers, etc., and the network service provider can provide the user with services of receiving message, sending message, social network interaction, video/audio playing or other services that can implement interaction with the user through wired or wireless network. In the exemplary embodiment, the handheld device 140 is a smart phone, though in other exemplary embodiments, the handheld device 140 is, for example, a digital photo frame display device, a desktop computer, a laptop computer, a tablet PC, an E-book, a mobile phone, or a multimedia display device, etc.

In the exemplary embodiment, the video/audio processing apparatus 160 is a set top box, though in other exemplary embodiments, the video/audio processing apparatus 160 can also be a smart TV stick, or can be configured in the display apparatus 100 to form one product or device, for example, a smart TV.

As shown in FIG. 1, in the exemplary embodiment, the video/audio processing apparatus 160 can provide a play content 10a and a prompt message 10b to the display apparatus 100 for displaying. The display apparatus 100 can display the play content 10a and the prompt message 10b. The breakaway judging apparatus 180 can provide a judging result indicating whether the play content 10a of the display apparatus 100 is a breakaway to the video/audio processing apparatus 160. The OTT service provider 120 can provide a message to be played to the video/audio processing apparatus 160, and the video/audio processing apparatus 160 generates the prompt message 10b corresponding to the message to be played to the display apparatus 100, where the message to be played can be subscribed content of the user, an E-mail, content of a social network, a text or voice message, etc., which is not limited by the disclosure.

Moreover, the OTT service provider 120 can also directly transmit the message to be played to the handheld device 140 for displaying. Alternatively, the user can also click the prompt message 10b displayed on the display apparatus 100. Then, the video/audio processing apparatus 160 transmits the message corresponding to the prompt message 10b to the handheld device 140, such that the handheld device 140 displays the message.

Figure 2:
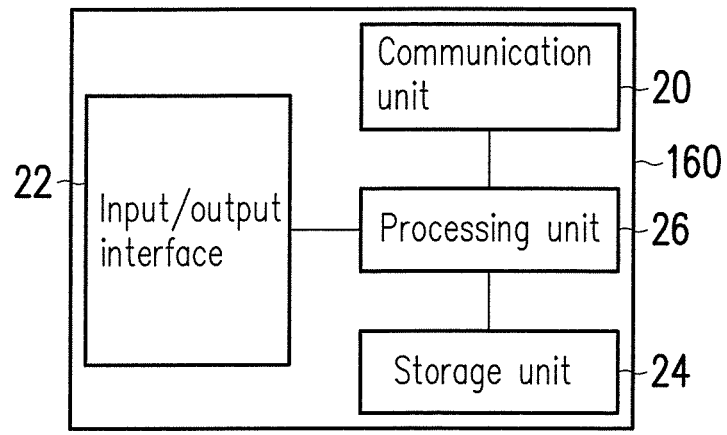
FIG. 2 is a schematic block diagram of a video/audio processing apparatus according to an exemplary embodiment of the disclosure.

FIG. 2 is a schematic block diagram of a video/audio processing apparatus according to an exemplary embodiment of the disclosure.

Referring to FIG. 1 and FIG. 2, the video/audio processing apparatus 160 includes a communication unit 20, an input/output interface 22, a storage unit 24 and a processing unit 26.

The communication unit 20 is, for example, a wireless transceiver unit supporting a wireless communication standard such as institute of electrical and electronics engineers (IEEE) 802.11n/b/g, which can establish network connections with other external devices through a wireless manner. Moreover, the communication unit 20 can also include a third generation telecommunication (3G) module, a long term evolution (LTE) network communication interface, a Wi-Fi module or a Bluetooth module, etc., and can establish network connections with other external devices through the wireless manner. For example, the communication unit 20 may be a wireless transceiver unit with an antenna, etc. Moreover, the communication unit 20 can also support a wired network, and is, for example, a network card, which is not limited by the disclosure.

The input/output interface 22 can be a device supporting a twisted pair transmission, a coaxial cable transmission, an optical fiber transmission or other transmission media transmission. Moreover, the input/output interface 22 can also be complied with a parallel advanced technology attachment (PATA) standard, and IEEE 1394 standard, a peripheral component interconnect (PCI) express standard, a universal serial bus (USB) standard, an ultra high speed-I (UHS-I) interface standard, and ultra high speed-II (UHS-II) interface standard, a serial advanced technology attachment (SATA) standard, a memory stick (MS) interface standard, a multi media card (MMC) interface standard, a compact flash (CF) interface standard, an integrated device electronics (IDE) standard or other suitable standards. In the exemplary embodiment, the input/output interface 22 is a device supporting the coaxial cable transmission, and can support data transmission of a TCP/IP transmission protocol through the communication unit 20. To be specific, the input/output interface 22 can receive a signal source of a coaxial cable, send a signal processed by the processing unit 26, or send a related message (for example, a channel number of a current play content, the current play content, etc.) transmitted by the coaxial cable.

The storage unit 24 can be a static random access memory (SRAM), a dynamic random access memory (DRAM), a hard disk, a flash memory, or any memory or storage device capable of storing electronic signals or data. In the exemplary embodiment, the storage unit 24 can be used to temporarily store messages coming from the OTT service provider or APP for providing to the user. When these messages cannot be displayed to the user instantly (for example, the play content is not in a breakaway time), the messages are temporarily stored in the storage unit 24 first.

The processing unit 26 is coupled to the communication unit 20, the input/output interface 22 and the storage unit 24, and outputs a play content message to the breakaway judging apparatus 180 through the input/output interface 22, where the play content message is information corresponding to the play content 10a of the display apparatus 100. In one embodiment, the play content message may include extending information related to the play content 10a. For example, in the exemplary embodiment, the play content message is a channel number of the play content currently viewed by the user. In the exemplary embodiment, the play content 10a can be a streaming video, a content streaming of the TV channel or other types of digital or analog video/audio content, which can be provided by a practitioner (system provider) of cable television or a channel provider. The processing unit 26 can also convert a signal received by the input/output interface 22 into a play format supported by the display apparatus 100, and outputs the converted signal (i.e. the play content 10a in FIG. 1) to the display apparatus 100 through the input/output interface 22.

The processing unit 26 can receive a notification message from the breakaway judging apparatus 180 (which is described later) through the input/output interface 22, where the notification message is used for indicating whether a play time of the play content corresponding to the play content message (for example, the current channel number) is in a breakaway time. If the play time corresponding to the current play content is not in the breakaway time, the storage unit 24 temporarily stores the message to be provided to the user from the OTT service provider or the APP, and if the play time corresponding to the current play content is in the breakaway time, the processor unit 26 can superimpose the prompt message 10b to the play content. The prompt message 10b may correspond to a message provided by the OTT service provider 120, for example, an event notification, an advertisement, a TV program extra content, etc., and can also be a message provided by the OTT service provider 120. The prompt message 10b can be the content of the channel currently viewed by the user or other message, for example, it is assumed that when the play content is a food program, the prompt message 10b can be a name, an address or a telephone number, etc. of a restaurant mentioned in the program. Moreover, the prompt message 10b can also be a function or program set the by user, for example, a calendar notification, an alarm clock, a timer reminder, or a prompt message corresponding to a specific channel program/advertisement notification, etc. The processor unit 26 can superimpose the prompt message 10b on the play content 10a, and sends to the display apparatus 100 through the input/output interface 22. Then, the display apparatus 100 displays the superimposed play content 10a and prompt message 10b, and the user can complete operation and interaction according to the prompt message 10b during the breakaway time.

It should be noted that the content corresponding to the prompt message 10b is, for example, the message provided by the aforementioned OTT service provider 120 or the function or program set by the user. In an exemplary embodiment, the processor unit 26 further determines instantaneity of the message to be provided to the user, so as to determine a display timing. For example, the processing unit 26 further determines whether the message is an instant message or a non-instant message. If the message is the instant message, the processing unit 26 immediately transmits the prompt message 10b corresponding to the message to the display apparatus 100, and the display apparatus 100 can immediately display the prompt message 10b on the play content currently viewed by the user. If the message is not the instant message, the display apparatus 100 displays the prompt message 10b when the play time of the aforementioned play content viewed by the user is in the breakaway time. By determining instantaneity of the message, it is determined whether to immediately provide the prompt message 10b to the user, so as to decrease an interference on the play content viewed by the user, and avoid influencing or interrupting the user from viewing the play content.

The input/output interface 22 can further receive an operation of the user performed on the prompt message 10b. For example, the user can operate the prompt message 10b through a remote controller or other devices. The processor unit 26 can determine whether to superimpose the message corresponding to the prompt message 10b to the play content 10a according to the above operation, and transmits the play content superimposed with the message to the display apparatus 100 through the input/output interface 22, so as to display the play content superimposed with the message on the display apparatus 100. In other exemplary embodiments, the video/audio processing apparatus 160 can also send the prompt message 10b to the handheld device 140 through the input/output interface 22, so as to display the prompt message 10b on the handheld device 140 besides the display apparatus 100. For example, the user can receive the prompt message 10b through a handheld device (for example, a mobile phone), and the prompt message 10b is displayed on a screen of the handheld device.

In an exemplary embodiment, the processing unit 26 further determines whether the current play content of the display apparatus 100 is in a channel sequential switching state. The channel sequential switching state is a state that the user arbitrarily switches and browses a plurality of channels within a short time, and does not represent an operation that the user selects to switch to a specific channel. For example, the user can switch the channels in a sequential increasing or decreasing manner, and a stay time of each channel is within a predetermined time, for example, 3 seconds or within 3 seconds. If the play content 10a is in the channel sequential switching state, the processing unit 26 also superimposes the prompt message 10b to the play content 10a.

Moreover, in another exemplary embodiment, the prompt message 10b can also be displayed to the user when the video/audio processing apparatus 160 just activates a play function. For example, the prompt message 10b is displayed during a period of buffer time when the video/audio processing apparatus 160 just activates the play function and before the play content 10a is played. Alternatively, the prompt message 10b can be displayed to the user during a period of time after the video/audio processing apparatus 160 just activates the play function, and the user can reply, operate or select the prompt message 10b to end the display of the prompt message 10b. Moreover, the prompt message 10b can be automatically hidden after a period of time after activating the play function. In another exemplary embodiment, the prompt message 10b can also be displayed during a period of buffer time when the play function of the video/audio processing apparatus 160 is deactivated.

It should be noted that the processing unit 26 may adopt a hardware device composed of logic circuit components to execute the functions of the processing unit 26. Moreover, the processing unit 26 can also execute the aforementioned functions by loading programs stored in the storage unit 24 of the video/audio processing device 160, which is not limited by the disclosure. In the embodiment, the processing unit 26 can be a central processing unit (CPU), a field-programmable gate array (FPGA) or a multi-purpose chip capable of loading programs to execute corresponding functions.

Referring to FIG. 1 again, the breakaway judging apparatus 180 is, for example, one or a plurality of desktop computers, laptop computers or servers, etc., which is used for judging whether a play time of a play content is in a breakaway time. It should be noted that although the breakaway judging apparatus 180 is an independent device, in other exemplary embodiments, the breakaway judging apparatus 180 can also be combined with the video/audio processing apparatus 160 to form a single apparatus.

Figure 3:
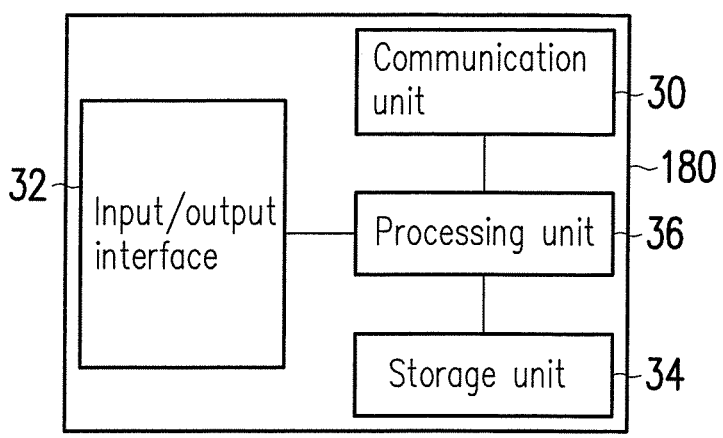
FIG. 3 is a schematic block diagram of a breakaway judging apparatus according to an exemplary embodiment of the disclosure.

FIG. 3 is a schematic block diagram of a breakaway judging apparatus according to an exemplary embodiment of the disclosure.

Referring to FIG. 1 to FIG. 3, the breakaway judging apparatus 180 includes a communication unit 30, an input/output interface 32, a storage unit 34 and a processing unit 36. A function of the communication unit 30 and communication protocols supported by the communication unit 30 are the same or similar to that of the communication unit 20. A function of the input/output interface 32 and data transmission formats supported by the input/output interface 32 are the same or similar to that of the input/output interface 22, which are not repeated. The storage unit 34 can be a SRAM, a DRAM, a hard disk, a flash memory, or any memory or storage device capable of storing electronic signals or data. The processing unit 36 may adopt a hardware device composed of logic circuit components to execute the functions of the processing unit 36. Moreover, the processing unit 36 can also execute functions thereof by loading programs stored in the storage unit 34 of the breakaway judging apparatus 180, which is not limited by the disclosure. In the embodiment, the processing unit 36 can be a CPU, a FPGA or a multi-purpose chip capable of loading programs to execute corresponding functions.

The processing unit 36 is coupled to the communication unit 30, the input/output interface 32 and the storage unit 34. In the exemplary embodiment, the breakaway judging apparatus 180 receives a play content through the input/output interface 32. The processing unit 36 can analyze the play content to establish one or a plurality of breakaway databases in the storage unit 34. Moreover, the breakaway judging apparatus 180 can also receive a play content message (for example, a current channel number) through the input/output interface 32, and the processing unit 36 can perform similarity comparison according to an advertising fingerprint of the play content to be analyzed and one or a plurality of advertising fingerprints in the breakaway database and a breakaway rule, so as to judge whether the play time corresponding to the current play content is in a breakaway time. If the play time corresponding to the current play content is in the breakaway time, a breakaway judging notification is sent through the input/output interface 32. The advertising fingerprint is a characteristic message corresponding to the play content, and the characteristic message can be a characteristic corresponding to an image of the play content, an audio of the play content or other characteristics of the play content.

Figure 4:
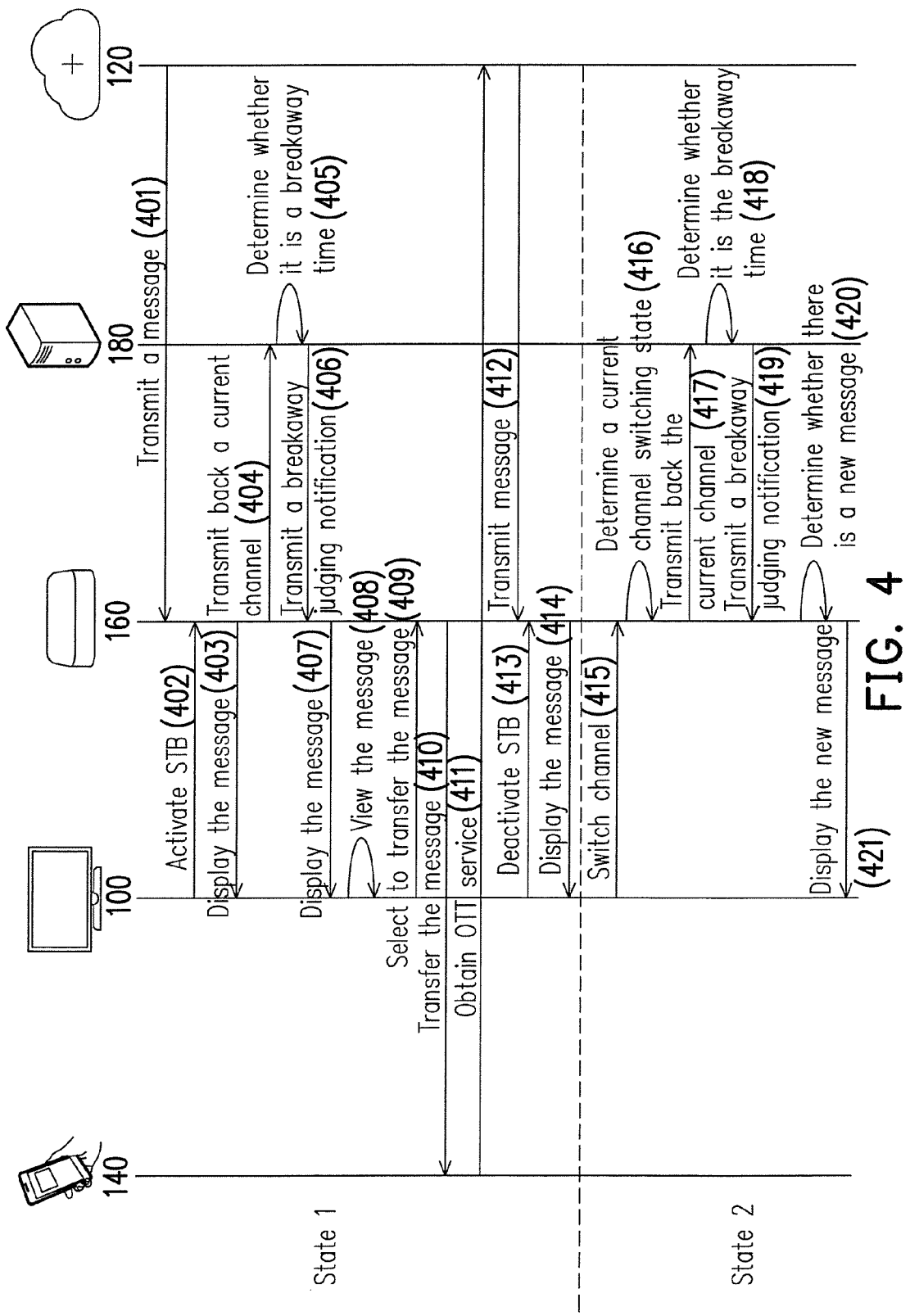
FIG. 4 is a flowchart illustrating signal transmission according to an exemplary embodiment of the disclosure.

FIG. 4 is a flowchart illustrating signal transmission according to an exemplary embodiment of the disclosure.

Referring to FIG. 4, in an exemplary embodiment, shown as a state 1, in step 401, when the OTT service provider 120 has a message for providing to the user, the OTT service provider 120 can transmit the message to the video/audio processing apparatus 160 through a network transmission manner. In the exemplary embodiment, in the step 401, the video/audio processing apparatus 160 is in a standby state, and a function of the video/audio processing apparatus 160 for receiving messages is not deactivated. Namely, when the video/audio processing apparatus 160 is in the standby state, the video/audio processing apparatus 160 can still receive and store the message coming from the OTT service provider 120. Then, in step 402, the user activates the display apparatus 100 and activates a play function of the video/audio processing apparatus 160 (for example, a play function of the cable television), in step 403, the video/audio processing apparatus 160 can display the message coming from the OTT service provider 120 on the display apparatus 100, such that the user can operate the message to end the display of the message, or the message automatically disappears after a time interval, and the user can view the play content. In step 404, the video/audio processing apparatus 160 transmits back the channel currently viewed by the user (i.e. the play content message) to the breakaway judging apparatus 180. Then, in step 405, the breakaway judging apparatus 180 judges whether the play time of the play content of the channel currently viewed by the user is the breakaway time. According to a judging result, in step 406, the breakaway judging apparatus 180 transmits a breakaway judging notification to the video/audio processing device 160. It is assumed that the play time of the play content currently viewed by the user is the breakaway time, in step 407, the video/audio processing apparatus 160 superimposes a prompt message related to the message of the OTT service provider 120 to the play content, and displays the prompt message through the display apparatus 100. In step 408, the user can browse the message through a handheld device or a remote controller, and can determine whether to display the message. In step 409, the user can select to transfer the message to other handheld devices, for example, the handheld device 140. In step 410, the video/audio processing apparatus 160 transfers the message provided by the OTT service provider 120 to the handheld device 140 for displaying, and in step 411, the user can get the message or a service of the OTT service provider 120 through the handheld device 140. In step 412, if the OTT service provider 120 transmits a new message to the video/audio processing apparatus 160, and in step 413, the user deactivates the play function of the video/audio processing apparatus 160, in step 414, the video/audio processing apparatus 160 can display the message coming from the OTT service provider 120 on the display apparatus 100.

In another exemplary embodiment, shown as a state 2, when the play function of the video/audio processing apparatus 160 is activated, and when the user switches the play content, for example, in step 415, the user switches the channel of the display apparatus 100, the video/audio processing apparatus 160 can receive a message related to the channel from the display apparatus 100. Then, in step 416, the video/audio processing apparatus 160 determines whether a current channel switching state is a channel sequential switching state, and if the display apparatus 100 is now in the channel sequential switching state, the video/audio processing apparatus 160 may superimpose the prompt message to the play content for displaying in the display apparatus 100. If the play content of the display apparatus 100 is switched to a specific channel, it represents that the user wants to view such channel. In step 417, the video/audio processing apparatus 160 transmits back the current channel to the breakaway judging apparatus 180. Then, in step 418, the breakaway judging apparatus 180 judges whether the play time of the play content of the channel currently viewed by the user is the breakaway time. According to a judging result, in step 419, the breakaway judging apparatus 180 transmits a breakaway judging notification to the video/audio processing device 160. In step 420, the video/audio processing device 160 determines whether a message to be displayed to the user exists, for example, determines whether the message to be displayed to the user is stored in the storage unit thereof, or determines whether the message transmitted by the OTT service provider 120 is received, etc. It is assumed that the play time of the play content currently viewed by the user is the breakaway time and the message to be displayed to the user exists, in step 421, the video/audio processing device 160 superimposes a prompt message related to the message to the play content, and displays the prompt message through the display apparatus 100. In another exemplary embodiment, the steps 417-419 can be omitted, namely, in the step 416, the video/audio processing device 160 determines whether the current channel switching state is the channel sequential switching state, and if the display apparatus 100 is now in the channel sequential switching state, the step 420 is executed, by which the video/audio processing device 160 determines whether the message to be displayed to the user exists, and if the message to be displayed to the user exists, in the step 421, the video/audio processing device 160 superimposes a prompt message related to the message to the play content, and displays the prompt message through the display apparatus 100.

Figure 5:
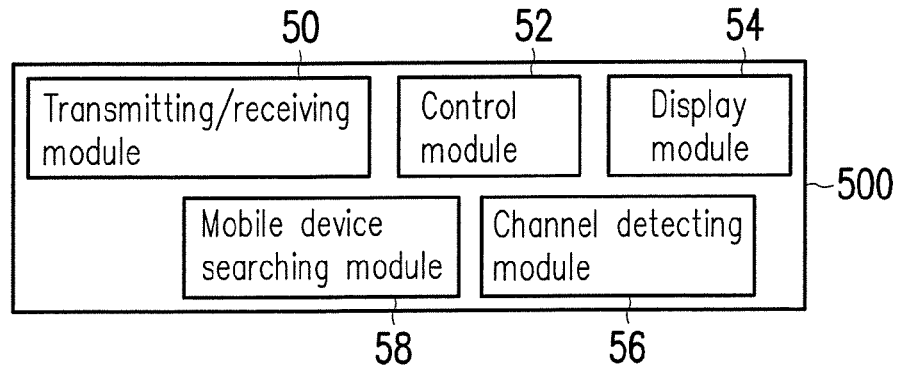
FIG. 5 is a software structural diagram implemented according to an exemplary embodiment of the disclosure.

FIG. 5 is a software structural diagram implemented according to an exemplary embodiment of the disclosure.

Referring to FIG. 5, in an exemplary embodiment, the video/audio processing device 160 may include a system 500, and the system 500 can be implemented by software. The system 500 can be an application programming interface (API) constructed based on an Android system. As shown in FIG. 5, the system 500 includes a transmitting/receiving module 50, a control module 52, a display module 54, a channel detecting module 56 and a mobile device searching module 58.

The transmitting/receiving module 50 can be used for transmitting or receiving the play content, information related to the play content, information of the OTT service provider, a prompt message provided by a user APP or an operation or setting message of the user. The control module 52 is used for receiving the operation of the user and executing a corresponding function. The display module 54 is used for providing a signal of the play content or providing a signal of the play content containing the superimposed message. The channel detecting module 56 is used for detecting whether the play content is in a channel sequential switching state. Moreover, the transmitting/receiving module 50 can notify the display module 54 according to the message provided by the OTT service provider 120 or an event provided by the user APP, and determines a timing for popping and displaying the prompt message according to a determination result of the play content and channel, wherein the determination result is determined by the channel detecting module 56. Moreover, the mobile device searching module 58 is used for searching whether a handheld device (for example, a tablet or mobile phone) capable of receiving and popping the message sent by the system 500 exits at periphery of the system 500.

Figure 6:
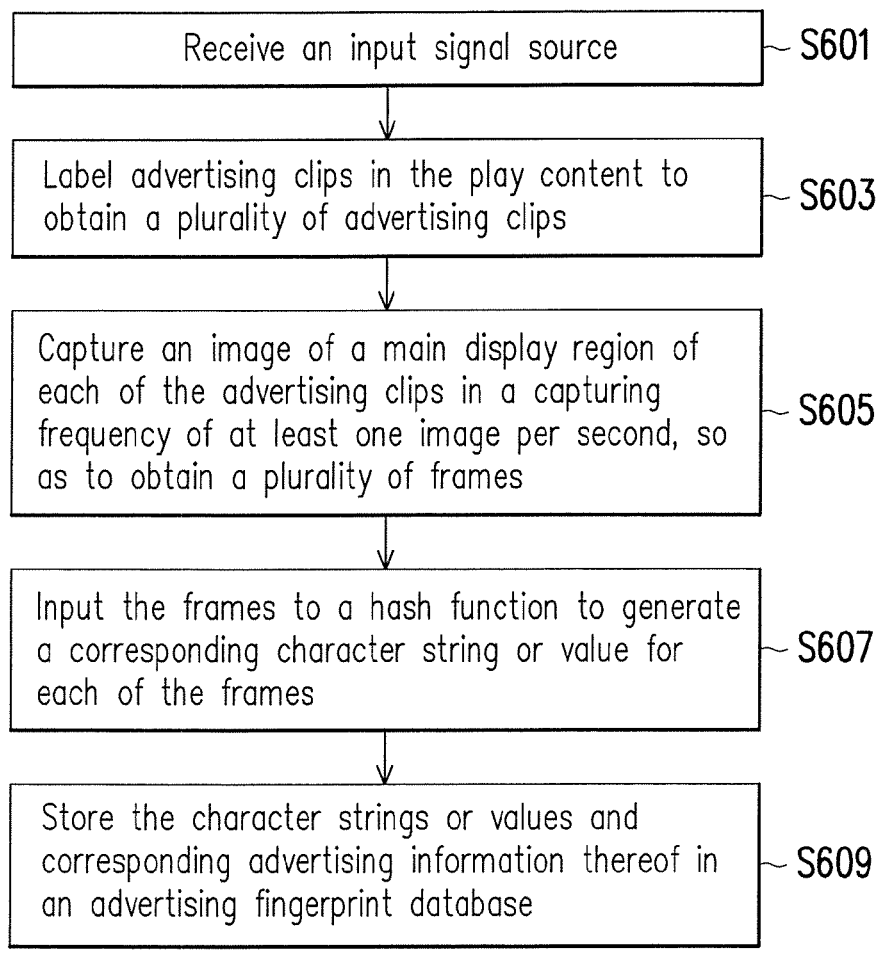
FIG. 6 is a flowchart illustrating a method for establishing an advertising fingerprint database according to an exemplary embodiment of the disclosure.

FIG. 6 is a flowchart illustrating a method for establishing an advertising fingerprint database according to an exemplary embodiment of the disclosure. The method for establishing the advertising fingerprint database may be performed by the breakaway judging apparatus 180 shown in FIG. 1.

Referring to FIG. 6, in step S601, an input signal source is received, where the input signal source has a corresponding play content. In step S603, advertising clips in the play content are labelled (for example, manually labelled) to obtain a plurality of advertising clips. In another exemplary embodiment, an advertiser or a channel provider can provide a plurality of advertising clips to obtain the advertising clips. Then, in step S605, an image of a main display region (which is described later) of each of the advertising clips is captured in a capturing frequency of at least one image per second, so as to generate a plurality of frames. In another exemplary embodiment, the whole image of the advertising clip can be captured instead of capturing the main display region. Then, in step S607, the frames are input to a hash function to generate a characteristic message for each of the image frames, where the characteristic message can be a character string or a value of the corresponding frame, and each character string or value belongs to one of the advertising clips. Finally, in step S609, the characteristic messages (for example, the character strings or values) and corresponding advertising information thereof are stored in the advertising fingerprint database.

Figure 7A:
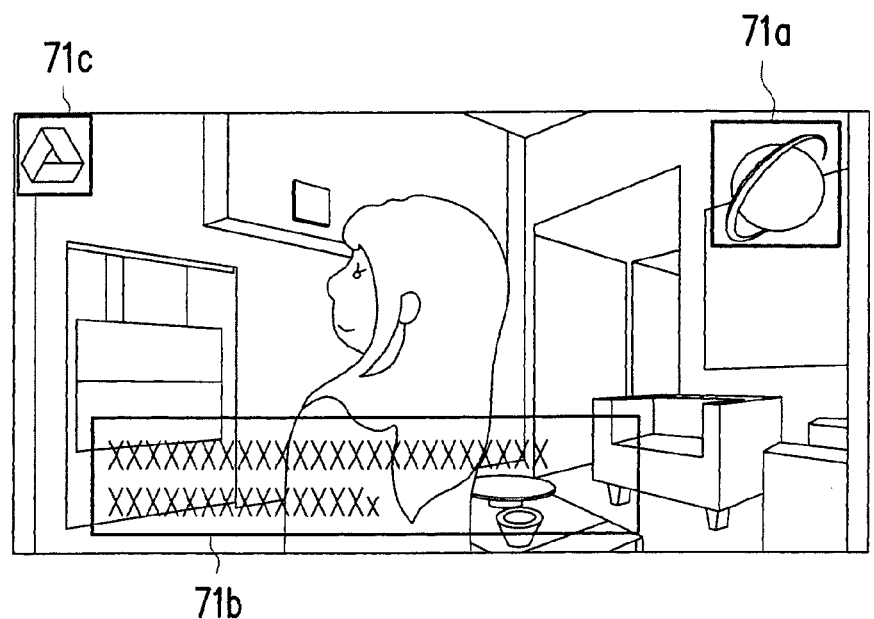
FIG. 7A-FIG. 7B are schematic diagrams of capturing an image of a main display region according to an exemplary embodiment of the disclosure.
Figure 7B:
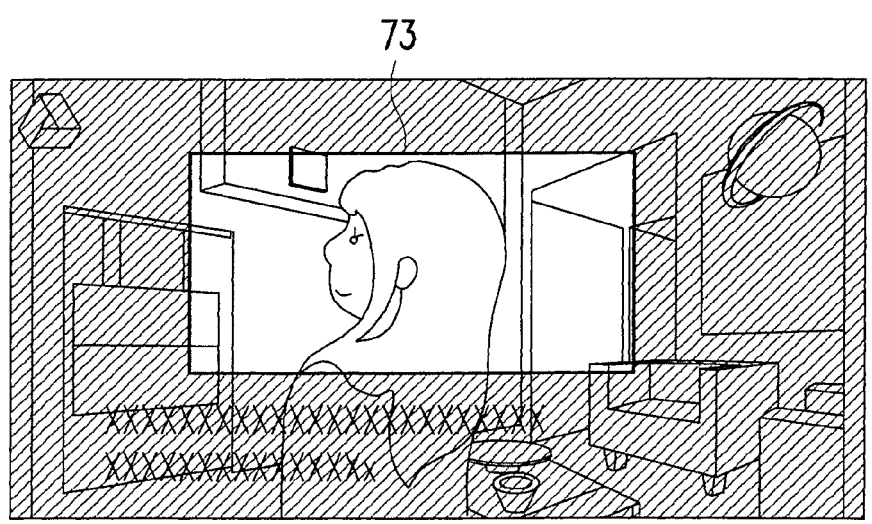

FIG. 7A-FIG. 7B are schematic diagrams of capturing an image of a main display region according to an exemplary embodiment of the disclosure.

Referring to FIG. 7A and FIG. 7B, as shown in FIG. 7A, regarding a channel practitioner, the channel practitioner often superimposes extra information on the images of the channel, for example, a channel logo 71a, instant news messages 71b, or other superimposed content 71c, etc. However, the superimposed content of the channel is different for different channel practitioners. When a same advertising clip is played in different channels, due to the difference of the superimposed content, the advertising fingerprints generated through the hash function can also be different. Therefore, if the whole image of the advertising clip is used to construct the advertising fingerprint, it may cause a determination error in comparison of the advertising fingerprints.

Therefore, in order to avoid generating the determination error of the advertising fingerprints, as shown in FIG. 7B, when the image used for generating the advertising fingerprint is captured, an image of a main display region 73 of the display content can be captured to serve as a frame used for generating the advertising fingerprint. A range of the main display region 73 can be customized by a system developer. The main display region 73 may exclude information additionally superimposed to the play content by the channel practitioner or service provider.

Figure 8:
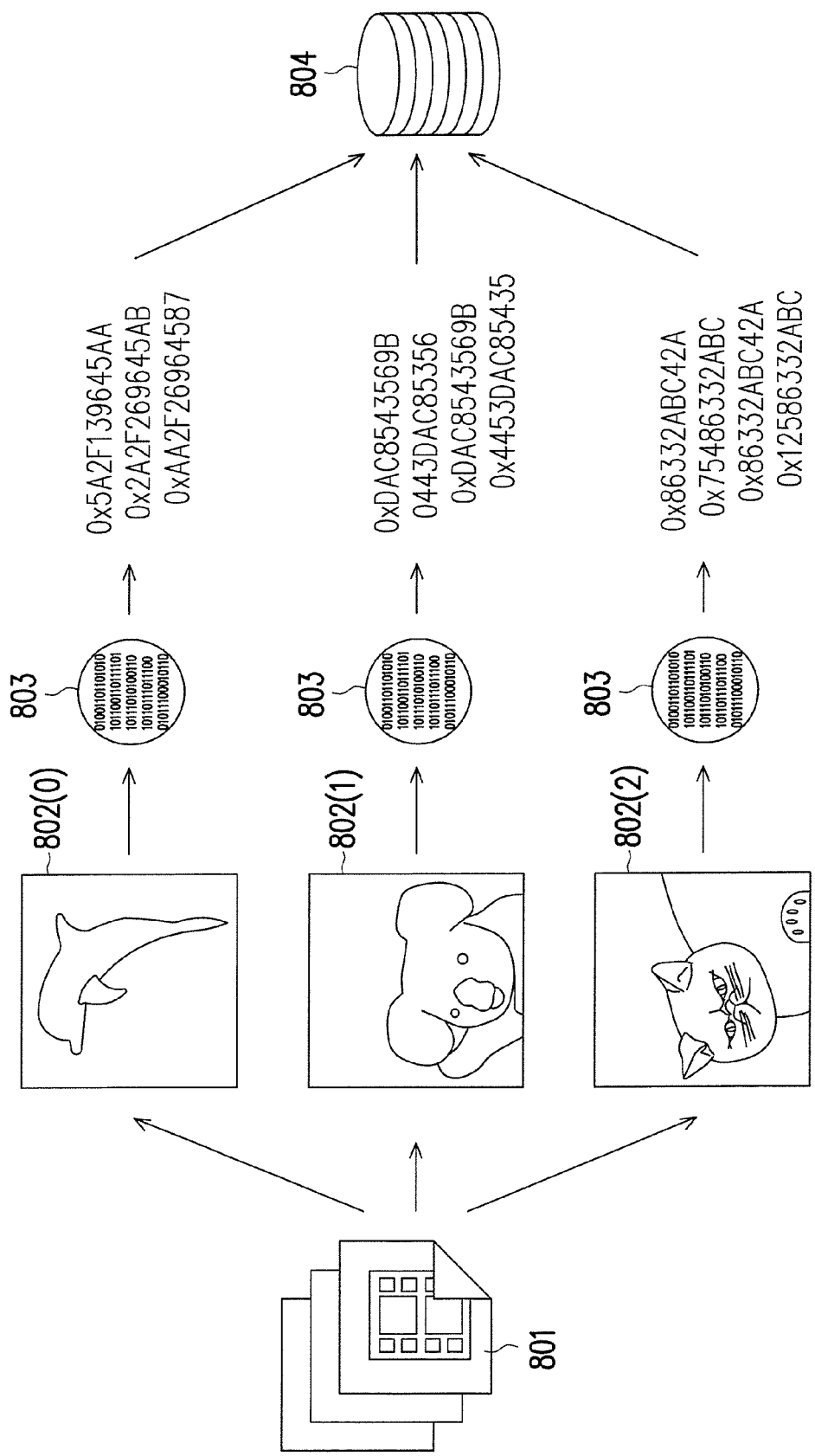
FIG. 8 is a schematic diagram of inputting frames into a hash function to generate corresponding character strings according to an exemplary embodiment of the disclosure.

FIG. 8 is a schematic diagram of inputting frames into the hash function to generate corresponding character strings according to an exemplary embodiment of the disclosure.

Referring to FIG. 8, an advertising clip 801 is, for example, a plurality of advertising clips obtained according to the step S603 of FIG. 6, by which the advertising clips in the play content are manually labelled to obtain the advertising clips. Then, an image of a main display region of each of the advertising clips 801 is captured periodically (for example, in a capturing frequency of at least one image per second), so as to generate a plurality of frames 802(0)-802(2). Then, the frames 802(0)-802(2) are input into a hash function 803 to respectively obtain corresponding advertising fingerprints. In the exemplary embodiment, the advertising fingerprint is a character string having a plurality of bits. Finally, the advertising fingerprints and corresponding advertising information are stored in an advertising fingerprint database 804 for subsequent comparison. The advertising information corresponding to the advertising fingerprint includes a length, a playing date and/or a playing time, etc. of the advertisement. Moreover, a frame is taken as a unit to produce the advertising fingerprint, i.e. each frame corresponds one advertising fingerprint, and each advertisement has a plurality of frames and the corresponding advertising fingerprints.

Figure 9:
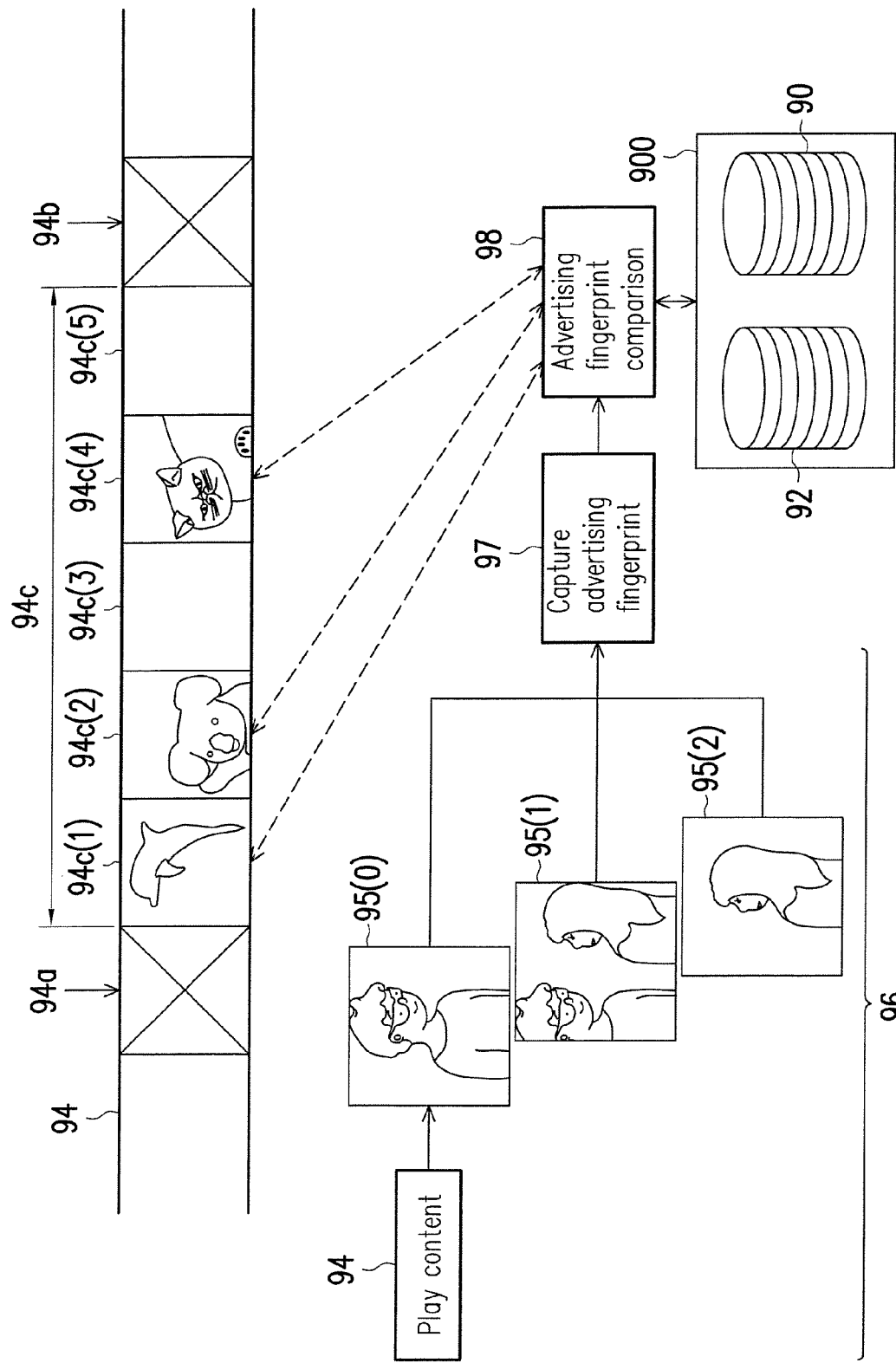
FIG. 9 is a schematic diagram of judging whether a play time of a current play content is in a breakaway time according to an exemplary embodiment of the disclosure.

FIG. 9 is a schematic diagram of judging whether a play time of a current play content is in a breakaway time according to an exemplary embodiment of the disclosure.

Referring to FIG. 9, in the exemplary embodiment, the breakaway time can be learned according to a breakaway rule database 90 stored in a storage medium 900 and/or by comparing advertising fingerprints in an advertising fingerprint database 92, and the storage medium 900 can be the storage unit 34 of the breakaway judging apparatus 180. A breakaway rule can be determined by a breakaway length and/or an advertising playing frequency or a combination thereof of a program type and/or a program time.

To be specific, the breakaway rule includes breakaway distribution and breakaway strategy. Regarding to the breakaway distribution, for example, a drama with a play content length of 60 minutes has five paragraphs and four breaks; a program with a play content length of 75 minutes has sixth paragraphs and five breaks; and a program with a play content length of 90 minutes generally has seven paragraphs and six breaks. Namely, the channel practitioner averagely distributes the breakaways according to a length of the play content, so as to make a profit by playing advertisements in the breakaway time.

The breakaway strategy refers to time and frequency of the breakaways. To be specific, in order to attract the audience to continually watch a program or cultivate a viewing habit of the audience, the channel practitioner postpones an appearance time of the first breakaway in the play content, or decrease the number of the breakaways in order to strive for an audience rating.

Based on the aforementioned culture and hidden rules of TV industry, by searching the related information (for example, the breakaway distribution and the breakaway strategy), the breakaway rule can be deduced according to the known advertising distributions by using a statistic method or a machine learning method.

Referring to FIG. 9, it is assumed that the user current views a play content 94, according to the breakaway rule in the breakaway rule database 90, a breakaway time of the play content 94 can be approximately analyzed, for example, a breakaway with a breakaway time section of 94c, which is between a break start time point 94a and a break end time point 94b. Then, in step 96, frames in the current play content 94 are captured, for example, frames 95(0)-95(2) are captured. To be specific, an image of a main display region of the play content 94 is captured in a capturing frequency of at least one image per second, so as to generate a plurality of frames corresponding to the images. The main display region is as that described in description of FIG. 7A and FIG. 7B, and a detail thereof is not repeated.

Then, in step 97, the system inputs each of the captured frames into a hash function to generate a corresponding advertising fingerprint for each of the frames. In the exemplary embodiment, the advertising fingerprint is a character string with a length of 10. Then, in step 98, the advertising fingerprints are compared with a plurality of advertising fingerprints in the advertising fingerprint database 92. Based on similarity comparison, if at least one advertising fingerprint in the advertising fingerprint database is similar to the compared advertising fingerprint, it is determined that the current play time of the play content 94 is in the breakaway time. In the exemplary embodiment, the similarity comparison is to compare a hamming distance of two advertising fingerprints to calculate a difference degree of the two character strings, and if the similarity of the two character strings is higher than a threshold, it is determined that the advertisements corresponding to the two character strings are the same, and it is determined that the current play time of the play content 94 is in the breakaway time. However, the disclosure is not limited thereto, and in other exemplary embodiments, other similarity comparison algorithms can also be adopted.

It should be noted that since the breakaway rule is used as a reference for determining whether the current play time is in the breakaway time, which is not 100% accurate. When the advertising fingerprints obtained by capturing the images of the play content 94 are compared with the advertising fingerprints in the advertising fingerprint database 92, if the advertising fingerprint database 92 does not have the similar advertising fingerprint therein, it represents that the current play time of the play content 94 is not in the breakaway time. Namely, by comparing the advertising fingerprints, it can be determined whether the current play time of the play content is in the breakaway time. Moreover, when the captured advertising fingerprints are compared with the advertising fingerprints in the advertising fingerprint database, if the advertising fingerprint database has the similar advertising fingerprint therein, the currently played advertising can also be deter lined.

In another exemplary embodiment, taking FIG. 9 as an example, 94c(1), 94c(2) and 94c(4) are known advertisements, and the advertising fingerprints thereof have been stored in the advertising fingerprint database 92, and 94c(3) and 94c(5) are unknown advertisements, and advertising fingerprints thereof are still not stored in the advertising fingerprint database 92. When the user views the play content 94, the breakaway time of the play content 94 is not analyzed according to the breakaway rule, but frames (for example, the frames 95(0)-95(2)) of the current play content 94 are captured according to a predetermined frequency (for example, one frame per second). Then, as described above, in the step 97, the system inputs each of the captured frames into a hash function to generate a corresponding advertising fingerprint for each of the frames, so as to determine whether the current play time of the play content 94 is in the breakaway time. When an advertising clip (for example, 94c(1)) is determined based on the similarity comparison, a time length (for example, 94c) belonging to the breakaway time is determined according to the breakaway length of the advertising breakaway rule, and when the unknown advertisements (for example, 94c(3) and 94c(5)) are encountered, although the advertising fingerprint database does not has the advertising fingerprints of theses advertisements, such time interval is still determined to be within the breakaway time, and the advertising fingerprint database 92 can be trained according to the unknown advertisements.

Figure 10:
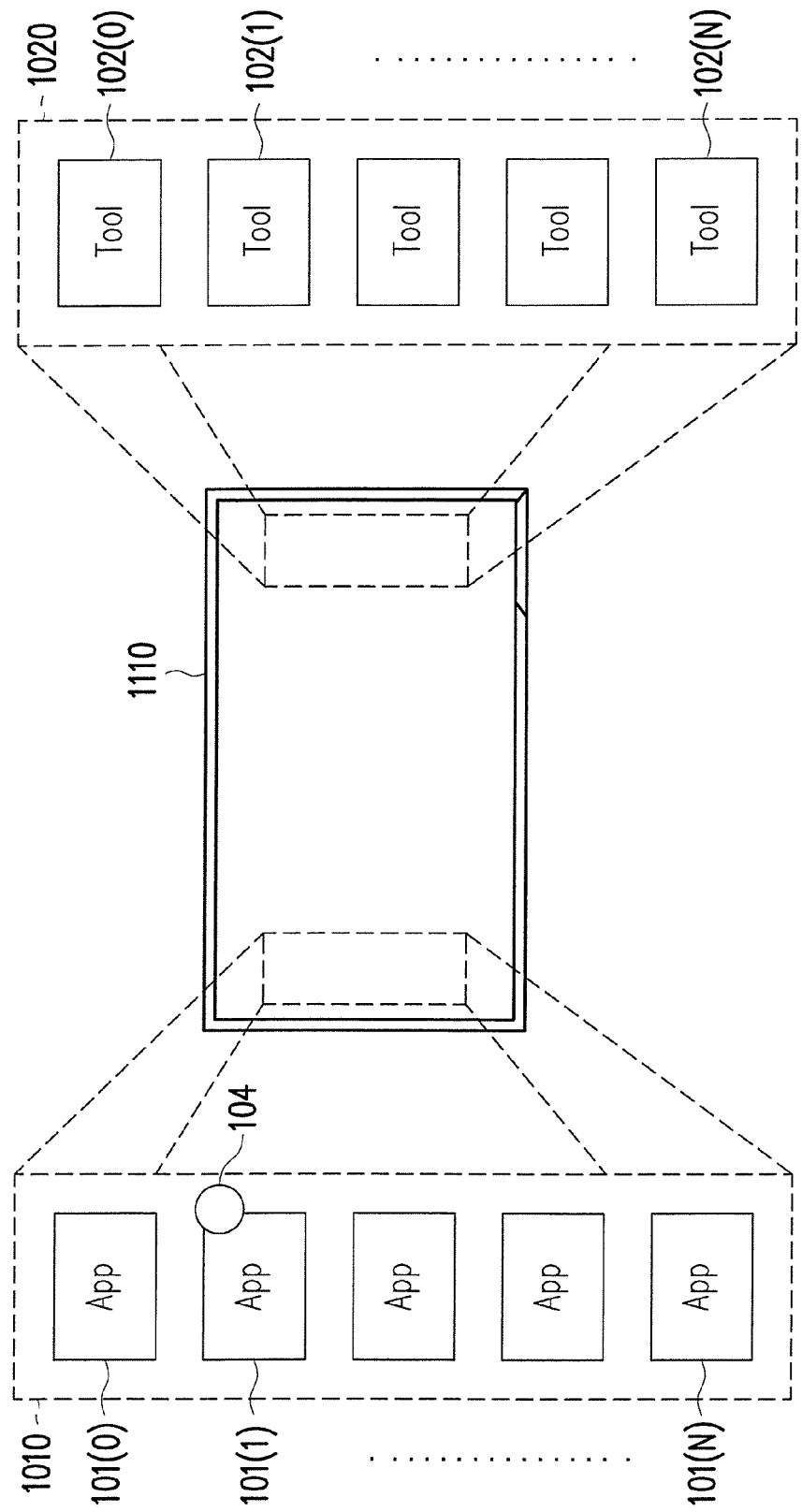
FIG. 10 is a schematic diagram of displaying a prompt message on a display apparatus according to an exemplary embodiment of the disclosure.

FIG. 10 is a schematic diagram of displaying a prompt message on a display apparatus according to an exemplary embodiment of the disclosure.

Referring to FIG. 10, if the current OTT service provider or the user APP has a message for providing to the user, it is assumed that the current play content of the display apparatus 1110 is in a state suitable for providing the prompt message, such as in the breakaway time, a just power-on state, or a state that the user continuously switches channels, the display apparatus 1110 can display the prompt message to remind the user. In an exemplary embodiment, the prompt message can be displayed at a left side or a right side of the display apparatus 1110, for example, displayed at a field 1010 and a field 1020. The field 1010, for example, includes APP 101(0)-101(N). It is assumed that the APP 101(1) has a message for providing to the user, a notification message 104 is then displayed at an upper right corner of an icon of the APP 101(1), so as to remind the user to click and read the corresponding message. Moreover, the field 1020 may include tools 102(0)-102(N) for assisting the user to use the display apparatus 1110. However, the disclosure is not limited to the display method of the field 1010 and the field 1020 and the options and functions corresponding to each of the fields, and in other exemplary embodiments, other fields, display method and corresponding functions can be adopted.

FIG. 11A-FIG. 11D are schematic diagrams illustrating different message display methods according to an exemplary embodiment of the disclosure.

Referring to FIG. 11A to FIG. 11D, it is assumed that when the user executes a selection operation according to the prompt message, a message corresponding to the prompt message is displayed on the display apparatus 1100.

Figure 11A:
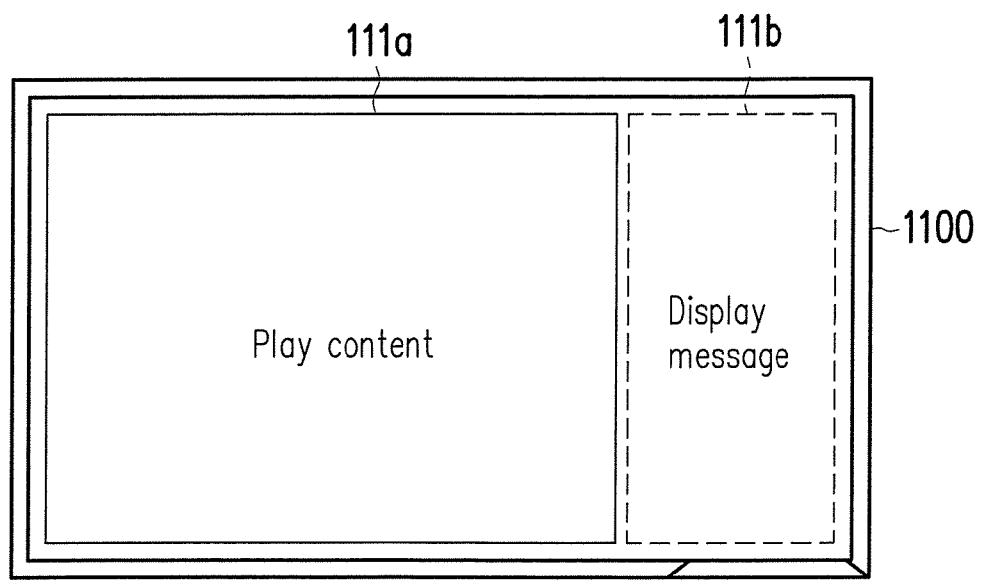
FIG. 11A-FIG. 11D are schematic diagrams illustrating different message display methods according to an exemplary embodiment of the disclosure.

As shown in FIG. 11A, in an exemplary embodiment, the message corresponding to the prompt message is superimposed to a right side region 111b of the display apparatus 1100, so as to facilitate the user to implement browsing and interaction. For example, the play content originally viewed by the user is compressed and displayed in a region 111a, or only an image corresponding to the region 111a in the original play content is displayed. Moreover, transparency of the prompt message in the region 111b can be increased, so as to display the message corresponding to the prompt message in the region 111b. Namely, in this case, a foreground displayed in the region 111b is the message corresponding to the prompt message, and a background thereof is the play content corresponding to the region 111b.

Figure 11B:
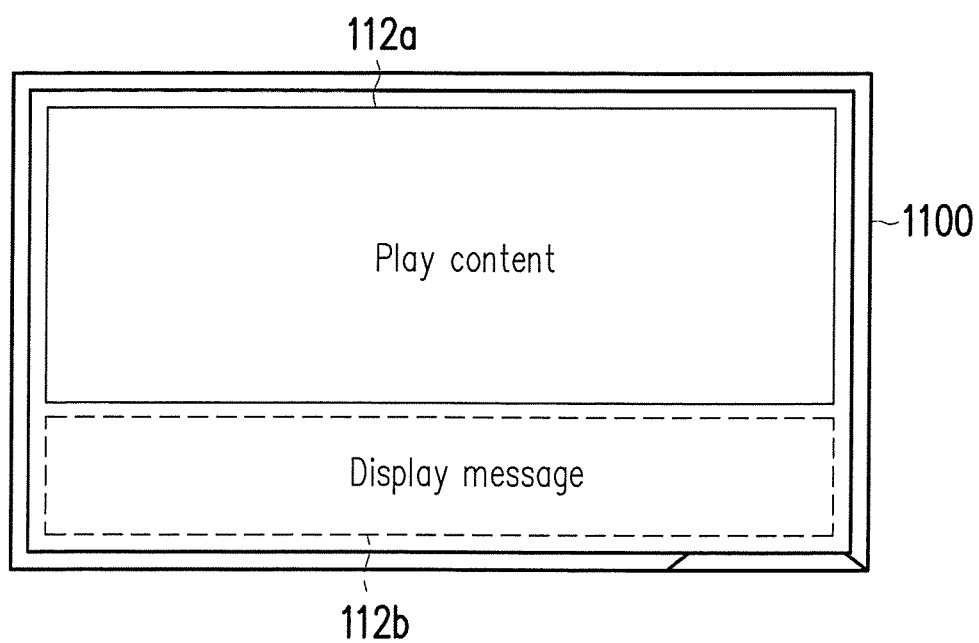

As shown in FIG. 11B, in an exemplary embodiment, the message corresponding to the prompt message is superimposed to a lower side region 112b of the display apparatus 1100, so as to facilitate the user to implement browsing and interaction. For example, the play content originally viewed by the user is compressed and displayed in a region 112a, or only an image corresponding to the region 112a in the original play content is displayed. Moreover, transparency of the prompt message in the region 112b can be increased, so as to display the message corresponding to the prompt message in the region 112b. Namely, in this case, a foreground displayed in the region 112b is the message corresponding to the prompt message, and a background thereof is the play content corresponding to the region 112b.

Figure 11C:
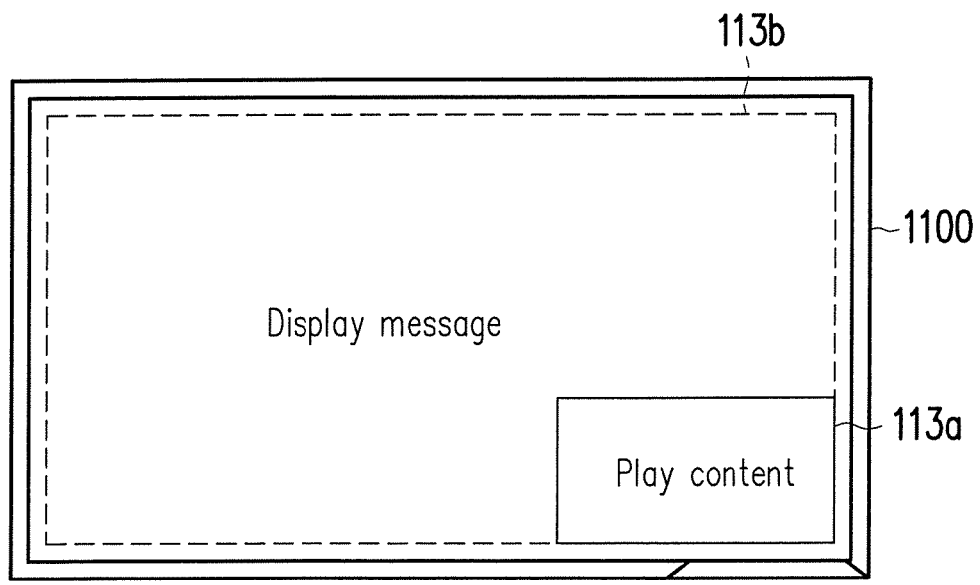

As shown in FIG. 11C, in an exemplary embodiment, the message corresponding to the prompt message is displayed in a whole display region 113b of the display apparatus 1100, so as to facilitate the user to implement browsing and interaction, and the original play content is compressed and displayed in a region 113a.

Figure 11D:
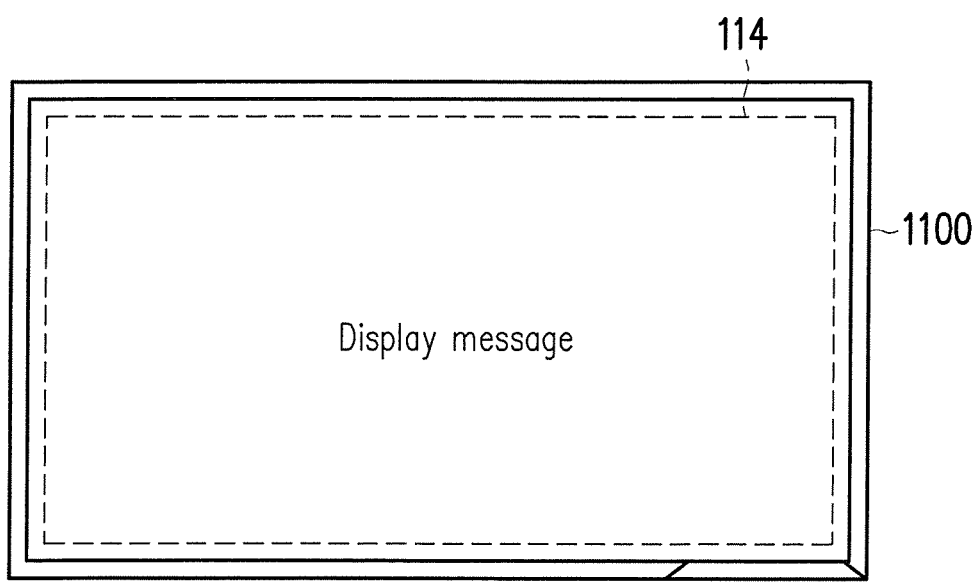

As shown in FIG. 11D, in an exemplary embodiment, the message corresponding to the prompt message is superimposed to a whole display region 114 of the display apparatus 1100, so as to facilitate the user to implement browsing and interaction. Moreover, transparency of the prompt message in the whole display region 114 can be increased, so as to display the message corresponding to the prompt message in the whole display region 114 of the display apparatus 1100. Namely, a foreground displayed in the whole display region 114 is the message corresponding to the prompt message, and a background thereof is the play content corresponding to the whole display region 114.

It should be noted that the aforementioned display methods of the message corresponding to the prompt message are only examples, and are not used for limiting the disclosure. Other embodiments of the disclosure may include other display methods.

Figure 12:
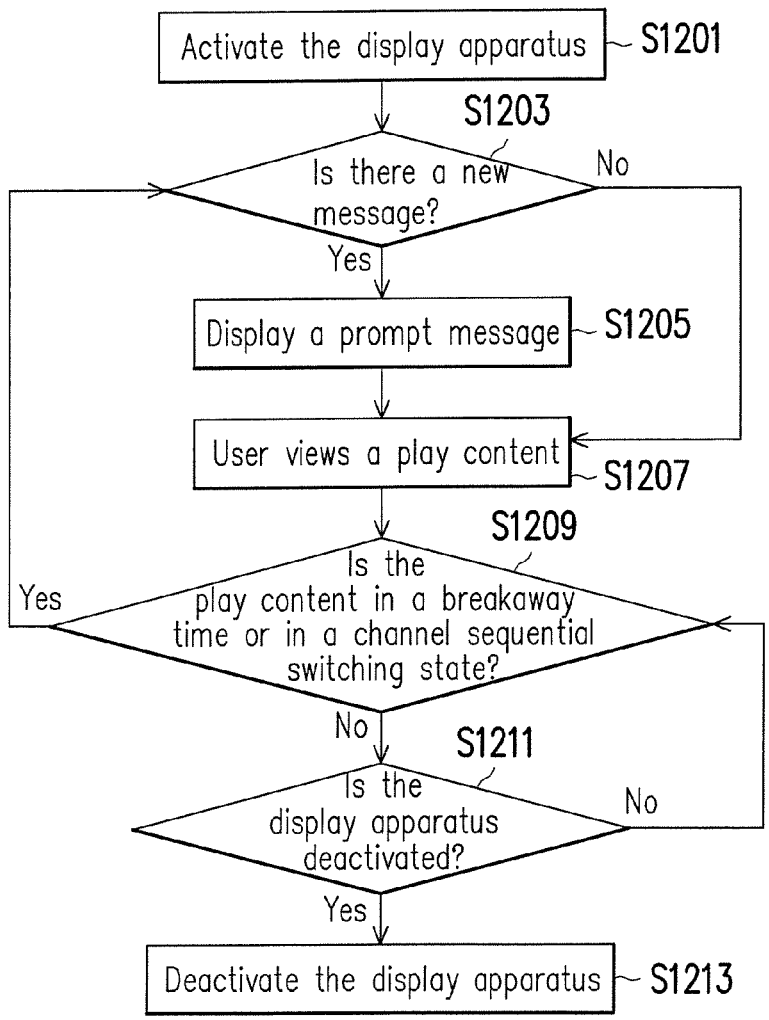
FIG. 12 is a flowchart illustrating a method for displaying a prompt message according to an exemplary embodiment of the disclosure.

FIG. 12 is a flowchart illustrating a method for displaying a prompt message according to an exemplary embodiment of the disclosure.

Referring to FIG. 12, in step S1201, when the display apparatus is activated, the display apparatus may be activated by the user or other means, in step S1203, the video/audio processing apparatus determines whether the storage unit thereof stores a message to the user provided by the OTT service provider or the user APP. If the storage unit of the video/audio processing apparatus does not store the message to the user provided by the OTT service provider or the user APP, a step S1207 is directly executed, by which the user views the play content of the display apparatus. If the storage unit of the video/audio processing apparatus stores the message to the user provided by the OTT service provider or the user APP, in step S1205, the video/audio processing apparatus superimposes the prompt message corresponding to the message to the play content, and displays the prompt message to the user through the display apparatus, such that the user can react or operate in response to the prompt message.

When the user completes viewing the prompt message or ends a corresponding operation, in the step S1207, the user can view the play content of the display apparatus. Then, in step S1209, the video/audio processing apparatus sends a play content message (for example, a channel number) of the current play content to the breakaway judging apparatus to judge whether the current play content is in a breakaway time, and the video/audio processing apparatus also determines whether the play content is in a channel sequential switching state. If the current play content is in the breakaway time or in the channel sequential switching state, the step S1203 is executed to determine whether there is a new prompt message to be provided to the user. If the current play content is not in the breakaway time or not in the channel sequential switching state, in step S1211, it is determined whether the user deactivates the display apparatus. If the user does not want to deactivate the display apparatus, the step S1209 is then executed to continually judge whether the play content viewed by the user is in the breakaway time or in the channel sequential switching state. If the user wants to deactivate the display apparatus, in step S1213, the display apparatus is deactivated.

Figure 13:
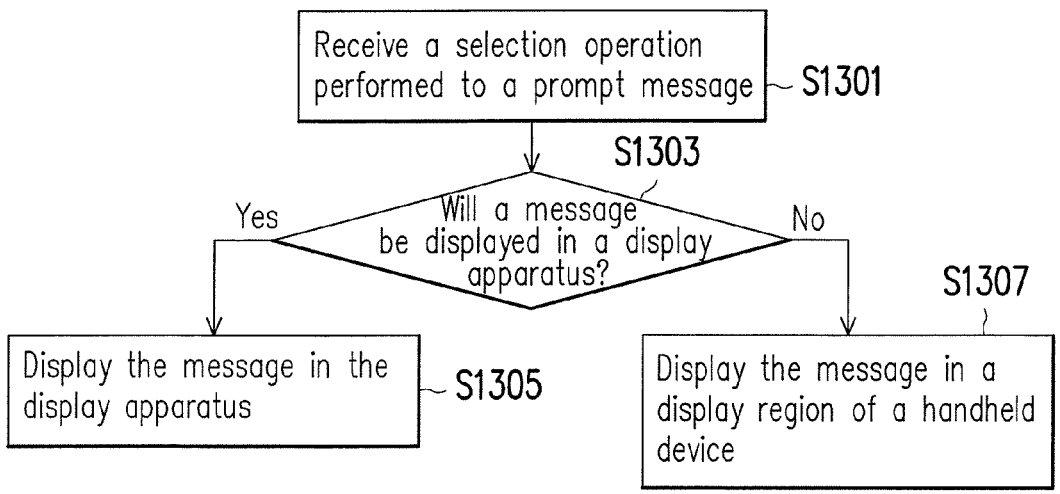
FIG. 13 is a flowchart illustrating a method for displaying a prompt message according to an exemplary embodiment of the disclosure.

FIG. 13 is a flowchart illustrating a method for displaying a prompt message according to an exemplary embodiment of the disclosure.

Referring to FIG. 13, the flowchart of FIG. 13 is a detailed flow of the step S1205 of FIG. 12. In step S1301, the video/audio processing apparatus receives a selection operation of the user performed on the prompt message, for example, the user performs the selection operation through a handheld device or a remote controller. Then, in step S1303, the video/audio processing apparatus determines whether to display the message corresponding to the prompt message on the display apparatus according to the operation of the user. If the user wants to display the message corresponding to the prompt message on the display apparatus displaying the play content, in step S1305, the video/audio processing apparatus displays the message on the display apparatus. If the user does not want to display the message corresponding to the prompt message on the display apparatus, in step S1307, the video/audio processing apparatus displays the message on a display region of the handheld device of the user according to the operation of the user.

Figure 14:
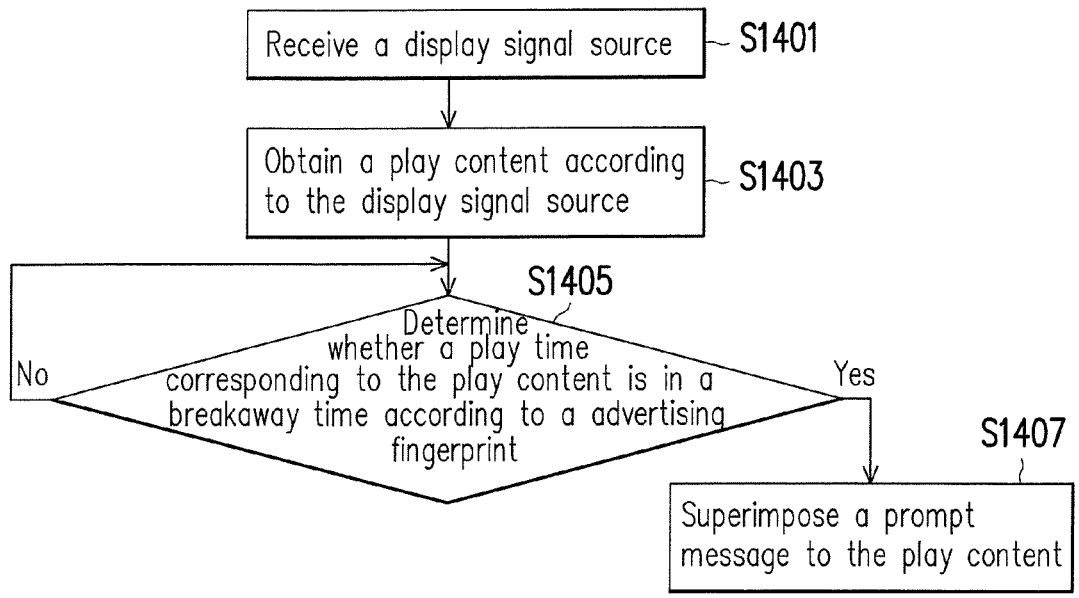
FIG. 14 is a flowchart illustrating a display control method according to an exemplary embodiment of the disclosure.

FIG. 14 is a flowchart illustrating a display control method according to an exemplary embodiment of the disclosure.

Referring to FIG. 14, in step S1401, the breakaway judging apparatus receives a display signal source. In step S1403, the breakaway judging apparatus obtains a play content according to the display signal source. Then, in step S1405, the breakaway judging apparatus compares one or a plurality of advertising fingerprints of the play content with, for example, the advertising fingerprints in the advertising fingerprint database, so as to judge whether a play time corresponding to the play content is in a breakaway time. If the play time corresponding to the play content is in the breakaway time, in step S1407, the breakaway judging apparatus sends a notification message to the video/audio processing apparatus, and the video/audio processing apparatus superimposes the prompt message to the play content. If the play time corresponding to the play content is not in the breakaway time, the step S1405 is repeated to wait for appearance of the breakaway time.

Figure 15:
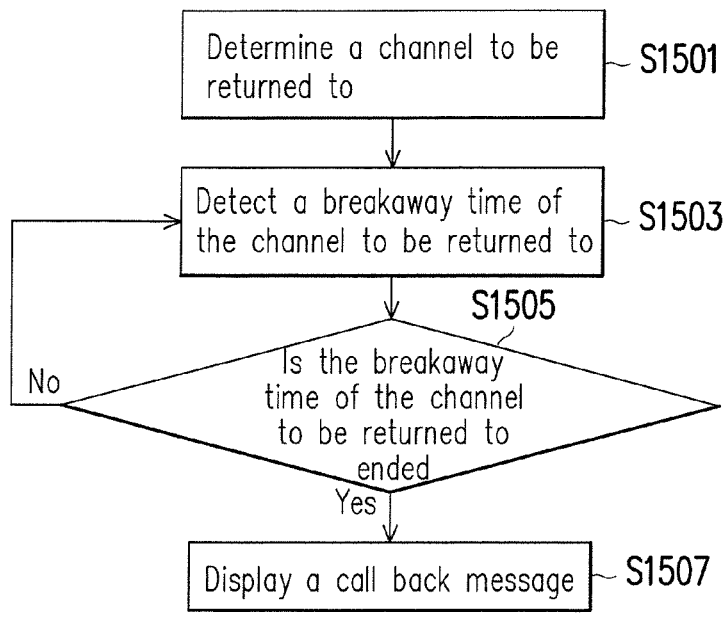
FIG. 15 is a flowchart illustrating a call back function according to an exemplary embodiment of the disclosure.

FIG. 15 is a flowchart illustrating a call back function according to an exemplary embodiment of the disclosure.

Referring to FIG. 15, in an exemplary embodiment of the disclosure, the step of determining whether the play time of the play content is in the breakaway time can also be applied to a call back function of the display apparatus. Based on such call back function, while the user freely browsing a plurality of channels, the user does not miss a program of a specific channel. Namely, the processing unit of the video/audio processing apparatus can judging whether the play time corresponding to the play content is in a breakaway time, and further determine whether the breakaway time is ended; if the breakaway time is ended or the play time corresponding to the play content is after an end of the breakaway time, the processing unit of the video/audio processing apparatus sends another prompt message, and displays the prompt message on the display apparatus to remind the user that the breakaway time is ended, wherein the another prompt message is used for prompting that the breakaway time of the play content is ended. A detailed flow thereof is described blow.

In step S1501, the video/audio processing apparatus determines a channel to be returned to. To be specific, the user can set to monitor a specific channel through the video/audio processing apparatus. When the breakaway time of such channel is ended or the play time corresponding to the play content is after an end of the breakaway time, an instant prompt message is sent, and the prompt message is superimposed to the play content to remind the user to return to the channel set by the user. Monitoring of the specific channel can be manually set by the user through an interface provided by the system, or can be automatically set by the video/audio processing apparatus according to user's behavior, for example, a time length or frequency for the user views each of the channels. For example, when one channel is viewed by the user for a period of time, for example, over 20 minutes, the video/audio processing apparatus automatically sets the channel as a channel to be monitored or reminded, and when the user switches to view other channels, as long as the breakaway time of such channel is ended, the video/audio processing apparatus sends a prompt message, and displays the prompt message on the display apparatus.

In step S1503, after the video/audio processing apparatus determines the channel to be returned to, the breakaway judging apparatus detects a breakaway time of the channel to be returned to.

In step S1505, when the breakaway time of the channel to be returned to is ended or the play time corresponding to the play content is after an end of the breakaway time, the breakaway judging apparatus sends a notification to the video/audio processing apparatus, and the video/audio processing apparatus provides a prompt message to the user according to the notification. When the breakaway time of the channel to be returned to is ended or the play time corresponding to the play content is after an end of the breakaway time, in step S1507, the video/audio processing apparatus will sends a call back message and displays the call back message through the display apparatus in order to remind the user that the breakaway time of the play content is ended. If the breakaway time of the channel to be returned to is not ended, the flow returns to the step S1503, and the breakaway judging apparatus continually detects the breakaway time of the channel to be returned to.

Figure 16:
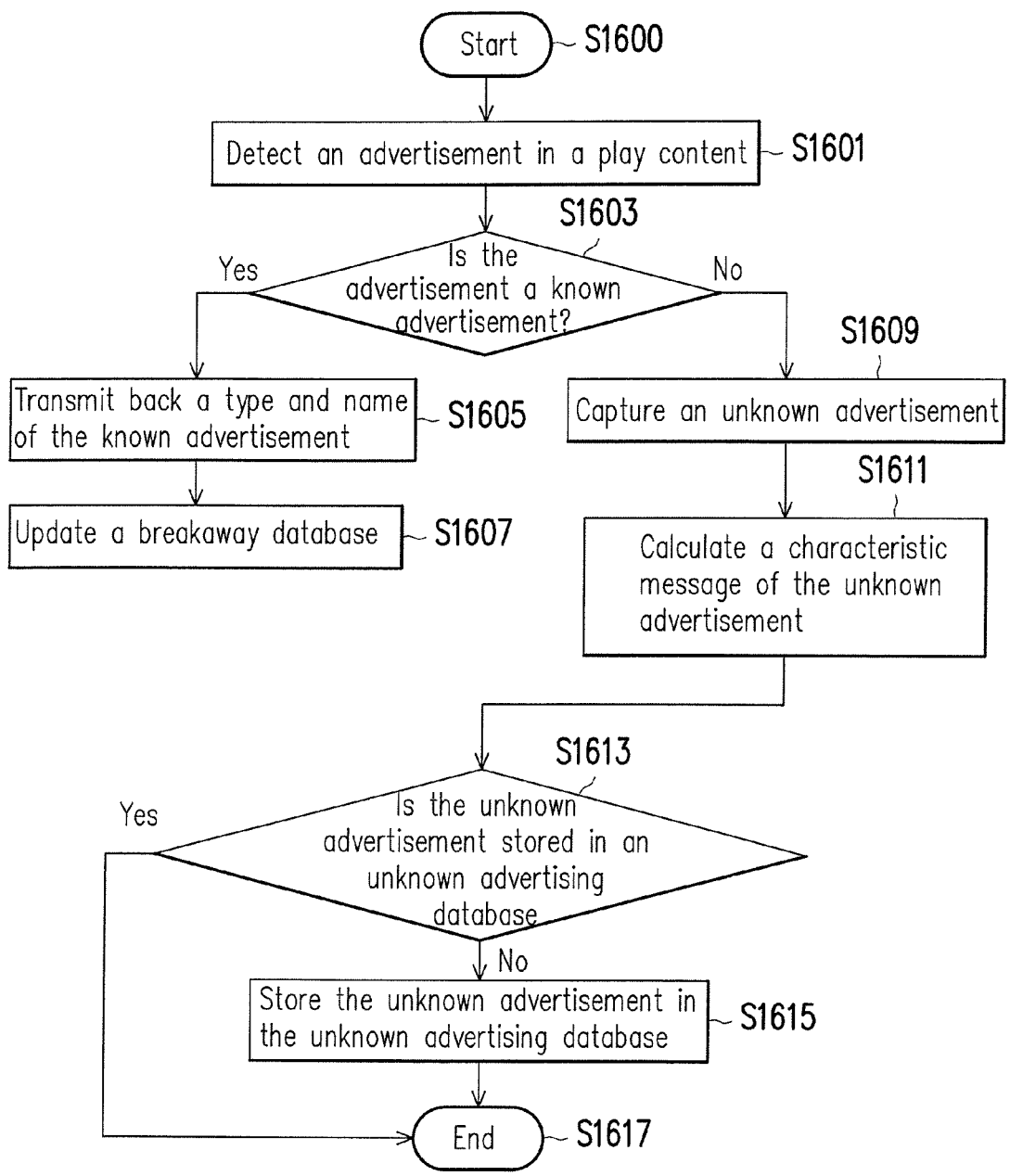
FIG. 16 is a flowchart illustrating a processing mechanism of a breakaway judging apparatus for an unknown advertisement according to an exemplary embodiment of the disclosure.

FIG. 16 is a flowchart illustrating a processing mechanism of the breakaway judging apparatus for an unknown advertisement according to an exemplary embodiment of the disclosure.

Referring to FIG. 16, in step S1600, the breakaway judging apparatus starts to execute a processing mechanism on an unknown advertisement. Then, in step S1601, the breakaway judging apparatus detects an advertisement in the play content according to a breakaway rule and an advertising fingerprint database, where the method for detecting the advertisement in the play content has been introduced in the embodiment of FIG. 9 and the aforementioned content, so that details thereof are not repeated. Then, in step S1603, the breakaway judging apparatus judges whether the advertisement in the play content is a known advertisement stored in a known advertising database. To be specific, in the exemplary embodiment, the breakaway database of the breakaway judging apparatus further includes the known advertising database (for example, a first region of the storage unit) and an unknown advertising database (for example, a second region of the storage unit), where the known advertising database stores advertising fingerprints, type information and names of a plurality of known advertisements, and the unknown advertising database stores advertising fingerprints of a plurality of unknown advertisements. The breakaway judging apparatus seeks a first advertising fingerprint in the known advertising database, where similarity between the first advertising fingerprint and a characteristic message of the unknown advertisement is higher than a first threshold.

If the breakaway judging apparatus determines that the currently detected advertisement is a known advertisement, in step S1605, the breakaway judging apparatus transmits back the type information and name of the currently detected advertisement to the video/audio processing apparatus according to the content of the known advertising database, and judges that the play time corresponding to the play content is in the breakaway time. Then, in step S1607, the breakaway judging apparatus updates the content of the breakaway database, for example, playing times of the advertisement.

If the breakaway judging apparatus determines that the currently detected advertisement is not a known advertisement, in step S1609, the breakaway judging apparatus captures an image of a main display region of the unknown advertisement, and in step S1611, the breakaway judging apparatus calculates a characteristic message of the unknown advertisement, where the method for calculating the characteristic message has been introduced in the embodiment of FIG. 8 and the aforementioned content, so that details thereof are not repeated. Then, in step S1613, the breakaway judging apparatus determines whether the unknown advertisement is stored in the unknown advertising database according to the characteristic message of the unknown advertisement. For example, the breakaway judging apparatus seeks a second advertising fingerprint in the unknown advertising database, where similarity between the second advertising fingerprint and the characteristic message of the unknown advertisement is higher than a second threshold. Then, a step S1617 is executed to end the flow of FIG. 16.

If the unknown advertisement is not stored in the unknown advertising database, in step S1615, the breakaway judging apparatus stores the characteristic message of the unknown advertisement into the unknown advertising database. In an exemplary embodiment, a system provider, a channel provider or the user can recognize, classify and/or name a plurality of advertisements stored in the unknown advertising database, and add the classified and/or named advertisements and the characteristic messages thereof into the known advertising database. Then, the step S1617 is executed to end the flow of FIG. 16.

Moreover, the exemplary embodiments of the disclosure can be applied to a shopping channel. When the user views the shopping channel, a discount information of an introduced product and a supplementary description of the product can be sent according to the technique of the disclosure. If the user has the willingness to buy, the user can complete a purchasing procedure through buttons, i.e. the user can complete the purchasing procedure on TV without making a phone call or accessing the Internet, by which a convenience of the TV shopping process is greatly improved. Moreover, when the user views other channels, a prompt message can be actively sent to notify the user that the shopping channel has the product concerned by the user, so as to enhance an exposure rate of the shopping channel and increase a chance of mating the products and the consumers, and create and stimulate more consumption.

In the disclosure, interference or interruption of the user viewing the play content can be avoided, such that after the user receives the prompt message on the display apparatus, the user can transfer the message to a handheld device (for example, a smart phone, a tablet), and then the user continually watch the TV program. After viewing of the play content come to an end, the user can view the message through the handheld device and perform an operation related to the message. Moreover, when many people watch a same display apparatus, the above mode does not interrupt a viewing activity of the others on the play content. The user can directly perform an operate through his own handheld device, and the other viewers still have the right of viewing and operating the display apparatus.

In the disclosure, the play content currently viewed by the user and information related to whether the play content is in the breakaway time, etc. can be provided to related operator and practitioner in a cloud service manner, such that the related practitioner can learn the channel content viewed by the user, and can deliver and receive information related to the channel content viewed by the user during an breakaway time without interfering the viewing activity of the user.

According to the above descriptions, the disclosure provides a method for display control, and the method is used for judging whether a play time of a play content currently viewed by a user is a breakaway time. If the play time of the play content currently viewed by the user is the breakaway time, a prompt message can be superimposed to a displayed image, and the user can interact with the prompt message. According to such method, in case that user's viewing is not influenced or interrupted, superimposed information besides the play content is provided in a same frame. According to such technique, a multi-screen information single-screen fusion effect and a two-way interactive optimisation effect are achieved on the display apparatus.

According to the above description, the user can receive an external information service notification, and can perform browse and control in a same frame, so as to achieve an effect of multi-screen information single-screen fusion. The user can obtain external information without manually switching another screen source or using other devices, so as to greatly increase usage convenience of the display apparatus.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display control method, adapted to a display control system, comprising:
   receiving a display signal source;
   obtaining a play content according to the display signal source, wherein the play content comprises a main display region and a minor display region, the main display region does not comprise a specific object superimposed to the play content and the minor display region includes the specific object superimposed to the play content;
   capturing a plurality of frames which are images of the play content and generating a characteristic message corresponding to the frames of the play content, wherein each of the frames is an image of the main display region;
   judging whether a play time corresponding to the play content is in a breakaway time according to at least one advertising fingerprint, wherein the at least one advertising fingerprint is the characteristic message corresponding to the frames of the play content, and the breakaway time is at least one time interval for playing at least one advertisement in the play content;
   superimposing a prompt message to the play content if the play time corresponding to the play content is in the breakaway time; and
   displaying another prompt message on a display apparatus if the play time corresponding to the play content is after an end of the breakaway time, wherein the another prompt message is used for prompting that the breakaway time of the play content is ended.

2. The display control method as claimed in claim 1, wherein the step of judging whether the play time corresponding to the play content is in the breakaway time according to the at least one advertising fingerprint comprises:
   judging whether the play time corresponding to the play content is in the breakaway time according to a breakaway rule, wherein the breakaway rule is determined by a breakaway length and/or an advertising playing frequency or a combination thereof of a program type and/or a program time.

3. The display control method as claimed in claim 1, wherein the at least one advertising fingerprint is obtained by periodically capturing a plurality of frames of the play content, and respectively inputting the frames into a hash function to respectively generate a plurality of characteristic messages corresponding to the frames.

4. The display control method as claimed in claim 1, wherein the step of judging whether the play time corresponding to the play content is in the breakaway time according to the at least one advertising fingerprint comprises:
   comparing the at least one advertising fingerprint with one or a plurality of advertising fingerprints in an advertising fingerprint database; and
   judging that the play time corresponding to the play content is in the breakaway time if the advertising fingerprint database has a first advertising fingerprint, wherein similarity between the first advertising fingerprint and the at least one advertising fingerprint is higher than a first threshold.

5. The display control method as claimed in claim 1, further comprising:

comparing the at least one advertising fingerprint with one or a plurality of advertising fingerprints in an advertising fingerprint database;

judging that the play content is a known advertisement if the advertising fingerprint database has a first advertising fingerprint, wherein similarity between the first advertising fingerprint and the at least one advertising fingerprint is higher than a first threshold; and judging that the play content is an unknown advertisement if the advertising fingerprint database does not have the first advertising fingerprint.

6. The display control method as claimed in claim 1, further comprising:

determining whether the play content is in a channel sequential switching state; and superimposing the prompt message to the play content if the play content is in the channel sequential switching state.

7. The display control method as claimed in claim 1, further comprising:

receiving a selection operation performed corresponding to the prompt message, and superimposing a message corresponding to the prompt message to the play content.

8. The display control method as claimed in claim 1, further comprising:

receiving a selection operation performed corresponding to the prompt message, and displaying a message corresponding to the prompt message in a display region of a handheld device.

9. The display control method as claimed in claim 3, wherein each of the frames is an image of the main display region which is in a customized region in the play content, and the image does not comprise a channel logo superimposed to the play content.

10. The display control method as claimed in claim 5, further comprising:

determining whether an unknown advertising database of the advertising fingerprint database has a second advertising fingerprint, wherein similarity between the second advertising fingerprint and the at least one advertising fingerprint is higher than a second threshold; and adding the at least one advertising fingerprint to the unknown advertising database if the unknown advertising database does not has the second advertising fingerprint.

11. The display control method as claimed in claim 10, further comprising:

recognizing the at least one advertising fingerprint; and adding the recognized at least one advertising fingerprint to a known advertising database.

12. A display control system, comprising:

a display apparatus;

a video/audio processing apparatus, coupled to the display apparatus; and a breakaway judging apparatus, coupled to the video/audio processing apparatus, and configured to receive a play content message comprising a play content from the video/audio processing apparatus, wherein the play content comprises a main display region and a minor display region, the main display region does not comprise a specific object superimposed to the play content and the minor display region includes the specific object superimposed to the play content, wherein the breakaway judging apparatus captures a plurality of frames which are images of the play content and generates a characteristic message corresponding to the frames of the play content, wherein each of the frames is an image of the main display region, wherein the breakaway judging apparatus judges whether a play time of the play content corresponding to the play content message is in a breakaway time according to at least one advertising fingerprint, wherein the at least one advertising fingerprint is the characteristic message corresponding to the frames of the play content, and the breakaway time is at least one time interval for playing at least one advertisement in the play content, if the play time corresponding to the play content is in the breakaway time, the breakaway judging apparatus transmits a notification message to the video/audio processing apparatus, the video/audio processing apparatus superimposes a prompt message to the play content, and the display apparatus displays the prompt message and the play content, if the play time corresponding to the play content is after an end of the breakaway time, the video/audio processing apparatus displays another prompt message on the display apparatus, wherein the another prompt message is used for prompting that the breakaway time of the play content is ended.

13. The display control system as claimed in claim 12, wherein the breakaway judging apparatus judges whether the play time corresponding to the play content is in the breakaway time according to the at least one advertising fingerprint comprises:

the breakaway judging apparatus judges whether the play time corresponding to the play content is in the breakaway time according to a breakaway rule, wherein the breakaway rule is determined by a breakaway length and/or an advertising playing frequency or a combination thereof of a program type and/or a program time.

14. The display control system as claimed in claim 12, wherein the at least one advertising fingerprint is obtained by the breakaway judging apparatus by periodically capturing a plurality of frames of the play content, and respectively inputting the frames into a hash function to respectively generate a plurality of characteristic messages corresponding to the frames.

15. The display control system as claimed in claim 12, wherein the operation that the breakaway judging apparatus judges whether the play time corresponding to the play content is in the breakaway time according to the at least one advertising fingerprint comprises:

the breakaway judging apparatus compares the at least one advertising fingerprint with one or a plurality of advertising fingerprints in an advertising fingerprint database of the breakaway judging apparatus, if the advertising fingerprint database has a first advertising fingerprint, wherein similarity between the first advertising fingerprint and the at least one advertising fingerprint is higher than a first threshold, the breakaway judging apparatus judges that the play time corresponding to the play content is in the breakaway time.

16. The display control system as claimed in claim 12, wherein the breakaway judging apparatus compares the at least one advertising fingerprint with one or a plurality of advertising fingerprints in an advertising fingerprint database of the breakaway judging apparatus, and if the advertising fingerprint database has a first advertising fingerprint, wherein similarity between the first advertising fingerprint and the at least one advertising fingerprint is higher than a first threshold, the breakaway judging apparatus judges that the play content is a known advertisement, and if the advertising fingerprint database does not have the first advertising fingerprint, the breakaway judging apparatus judges that the play content is an unknown advertisement.

17. The display control system as claimed in claim 12, wherein the video/audio processing apparatus determines whether the play content is in a channel sequential switching state, and if the play content is in the channel sequential switching state, the video/audio processing apparatus superimposes the prompt message to the play content.

18. The display control system as claimed in claim 12, wherein the video/audio processing apparatus receives a selection operation performed corresponding to the prompt message, and superimposes a message corresponding to the prompt message to the play content.

19. The display control system as claimed in claim 12, further comprising:

a handheld device, wherein when the video/audio processing apparatus receives a selection operation performed corresponding to the prompt message, the video/audio processing apparatus displays a message corresponding to the prompt message in a display region of the handheld device.

20. The display control system as claimed in claim 14 wherein each of the frames is an image of the main display region in the play content, wherein the main display region is a partial region of each of the frames, and the image does not comprise a channel logo superimposed to the play content.

21. The display control system as claimed in claim 16, wherein the breakaway judging apparatus determines whether an unknown advertising database of the advertising fingerprint database has a second advertising fingerprint, wherein similarity between the second advertising fingerprint and the at least one advertising fingerprint is higher than a second threshold, and if the unknown advertising database does not has the second advertising fingerprint, the breakaway judging apparatus adds the at least one advertising fingerprint to the unknown advertising database.

22. The display control system as claimed in claim 21, wherein the breakaway judging apparatus recognizes the at least one advertising fingerprint, and the breakaway judging apparatus adds the recognized at least one advertising fingerprint to a known advertising database.

23. A breakaway judging apparatus, comprising:

an input/output interface, configured to receive a display signal source; and a processing unit, coupled to the input/output interface, and configured to obtain a play content according to the display signal source, wherein the play content comprises a main display region and a minor display region, the main display region does not comprise a specific object superimposed to the play content and the minor display region includes the specific object superimposed to the play content, wherein the processing unit captures a plurality of frames which are images of the play content and generates a characteristic message corresponding to the frames of the play content, wherein each of the frames is an image of the main display region, wherein the processing unit judges whether a play time corresponding to the play content is in a breakaway time according to at least one advertising fingerprint, wherein the at least one advertising fingerprint is the characteristic message corresponding to the frames of the play content, and the breakaway time is at least one time interval for playing at least one advertisement in the play content, if the play time corresponding to the play content is in the breakaway time, the processing unit sends a breakaway judging notification through the input/output interface.

24. The breakaway judging apparatus as claimed in claim 23, wherein the operation that the processing unit judges whether the play time corresponding to the play content is in the breakaway time according to the at least one advertising fingerprint comprises:

the processing unit judges whether the play time corresponding to the play content is in the breakaway time according to a breakaway rule, wherein the breakaway rule is determined by a breakaway length and/or an advertising playing frequency or a combination thereof of a program type and/or a program time.

25. The breakaway judging apparatus as claimed in claim 23, wherein the at least one advertising fingerprint is obtained by the processing unit by periodically capturing a plurality of frames of the play content, and respectively inputting the frames into a hash function to respectively generate a plurality of characteristic messages corresponding to the frames.

26. The breakaway judging apparatus as claimed in claim 23, further comprising:

a storage unit, wherein the processing unit compares the at least one advertising fingerprint with one or a plurality of advertising fingerprints in the storage unit, if the advertising fingerprints in the storage unit comprise a first advertising fingerprint, the processing unit judges that the play time corresponding to the play content is in the breakaway time, wherein similarity between the first advertising fingerprint and the at least one advertising fingerprint is higher than a first threshold.

27. The breakaway judging apparatus as claimed in claim 23, further comprising:

a storage unit, wherein the processing unit compares the at least one advertising fingerprint with one or a plurality of advertising fingerprints in the storage unit, if the advertising fingerprints in the storage unit comprise a first advertising fingerprint, the processing unit judges that the play content is a known advertisement, wherein similarity between the first advertising fingerprint and the at least one advertising fingerprint is higher than a first threshold, if the storage unit does not have the first advertising fingerprint, the processing unit judges that the play content is an unknown advertisement.

28. The breakaway judging apparatus as claimed in claim 25, wherein each of the frames is an image of the main display region in the play content, wherein the main display region is a partial region of each of the frames, and the image does not comprise a channel logo superimposed to the play content.

29. The breakaway judging apparatus as claimed in claim 27, wherein the processing unit determines whether a plurality of advertising fingerprints in an unknown advertising storage region of the storage unit comprise a second advertising fingerprint, wherein whether the advertising fingerprints in the unknown advertising storage region comprise the second advertising fingerprint is determined according to whether similarity between the second advertising fingerprint and the at least one advertising fingerprint is higher than a second threshold, and if the unknown advertising storage region does not has the second advertising fingerprint, the processing unit adds the at least one advertising fingerprint to the unknown advertising storage region.

30. The breakaway judging apparatus as claimed in claim 29, wherein the processing unit recognizes the at least one advertising fingerprint, and the processing unit adds the recognized at least one advertising fingerprint to a known advertising storage region of the storage unit.

31. A video/audio processing apparatus, comprising:

an input/output interface; and a processing unit, coupled to the input/output interface, and configured to output a play content message comprising a play content through the input/output interface, and receiving a notification message generated by a breakaway judging apparatus through the input/output interface, wherein the play content comprises a main display region and a minor display region, the main display region does not comprise a specific object superimposed to the play content and the minor display region includes the specific object superimposed to the play content, wherein the breakaway judging apparatus generates the notification message by capturing a plurality of frames which are images of the play content and generating a characteristic message corresponding to the frames of the play content, wherein each of the frames is an image of the main display region, wherein the notification message is configured to indicate whether a play time of the play content corresponding to the play content message is in a breakaway time, wherein the breakaway time is at least one time interval for playing at least one advertisement in the play content, if the play time corresponding to the play content is in the breakaway time, the processing unit superimposes a notification message to the play content, if the play time corresponding to the play content is after an end of the breakaway time, the processing unit sends another prompt message through the input/output interface and displays the another prompt message on a display apparatus, wherein the another prompt message is used for prompting that the breakaway time of the play content is ended.

32. The video/audio processing apparatus as claimed in claim 31, wherein the processing unit determines whether the play content is in a channel sequential switching state, if the play content is in the channel sequential switching state, the processing unit superimposes the prompt message to the play content.

33. The video/audio processing apparatus as claimed in claim 31, wherein the input/output interface receives a selection operation performed corresponding to the prompt message, and the processing unit superimposes a message corresponding to the prompt message to the play content.

* * * * *